(12) United States Patent
Komura et al.

(10) Patent No.: US 7,527,889 B2
(45) Date of Patent: May 5, 2009

(54) FUEL CELL STACK

(75) Inventors: Takashi Komura, Iruma-gun (JP);
Narutoshi Sugita, Utsunomiya (JP);
Shigeru Inai, Shioya-gun (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 461 days.

(21) Appl. No.: 10/835,677

(22) Filed: Apr. 30, 2004

(65) Prior Publication Data

US 2004/0229100 A1  Nov. 18, 2004

Related U.S. Application Data

(63) Continuation-in-part of application No. 09/691,833, filed on Oct. 18, 2000, now Pat. No. 6,936,369.

(30) Foreign Application Priority Data

| Oct. 19, 1999 | (JP) | ................................ 11-297355 |
| Feb. 22, 2000 | (JP) | ............................. 2000-045002 |
| Mar. 16, 2000 | (JP) | ............................. 2000-074814 |

(51) Int. Cl.
*H01M 2/14* (2006.01)
(52) U.S. Cl. .............................. 429/38; 429/39; 429/34
(58) Field of Classification Search .................. 429/38, 429/39
See application file for complete search history.

(56) References Cited

U.S. PATENT DOCUMENTS

| 3,192,070 | A | | 6/1965 | Tragert et al. | |
| 4,037,024 | A | | 7/1977 | Landau | |
| 4,968,566 | A | | 11/1990 | Lersch et al. | |
| 5,514,487 | A | * | 5/1996 | Washington et al. | ........... 429/39 |
| 5,964,309 | A | * | 10/1999 | Kimura et al. | ............. 180/65.8 |
| 6,007,933 | A | * | 12/1999 | Jones | ........................... 429/38 |
| 6,048,633 | A | * | 4/2000 | Fujii et al. | ..................... 429/32 |
| 6,329,094 | B1 | | 12/2001 | Yasuo et al. | |
| 6,348,280 | B1 | | 2/2002 | Maeda et al. | |
| 6,365,295 | B1 | | 4/2002 | Matsukawa et al. | |
| 6,403,247 | B1 | | 6/2002 | Guthrie et al. | |
| 6,416,899 | B1 | | 7/2002 | Wariishi et al. | |

(Continued)

FOREIGN PATENT DOCUMENTS

JP  08138692 A  5/1996

(Continued)

OTHER PUBLICATIONS

Stein, Jess, The Random House College Dictionary 1980, Random House Publishing, Section T.

*Primary Examiner*—Bruce F Bell
(74) *Attorney, Agent, or Firm*—Lahive & Cockfield, LLP; Anthony A. Laurentano

(57) ABSTRACT

A fuel cell stack is provided with an outlet side oxygen-containing gas communication hole. First and second oxygen-containing gas flow passage grooves are provided in the direction of the gravity while meandering in the horizontal direction on a surface of a first separator. The second oxygen-containing gas flow passage grooves communicate with the outlet side oxygen-containing gas communication hole via second oxygen-containing gas connecting flow passages. The lowest position of the second oxygen-containing gas flow passage grooves 44 in the direction of gravity is higher than the bottom of the outlet side oxygen-containing gas communication hole 38*b* by the height h.

8 Claims, 27 Drawing Sheets

U.S. PATENT DOCUMENTS 6,461,754 B1    10/2002    Zeng
6,686,085 B1 *   2/2004    Fujii et al. .................... 429/39

FOREIGN PATENT DOCUMENTS

| | | | |
|---|---|---|---|
| JP | 10284096 A | 10/1998 | |
| JP | 2000 149977 A | 5/2000 | |
| JP | 2000-195529 A2 | 7/2000 | |
| JP | 2000-223137 A3 | 8/2000 | |
| WO | WO-98/52242 A1 | 11/1998 | |

* cited by examiner

F I G. 7
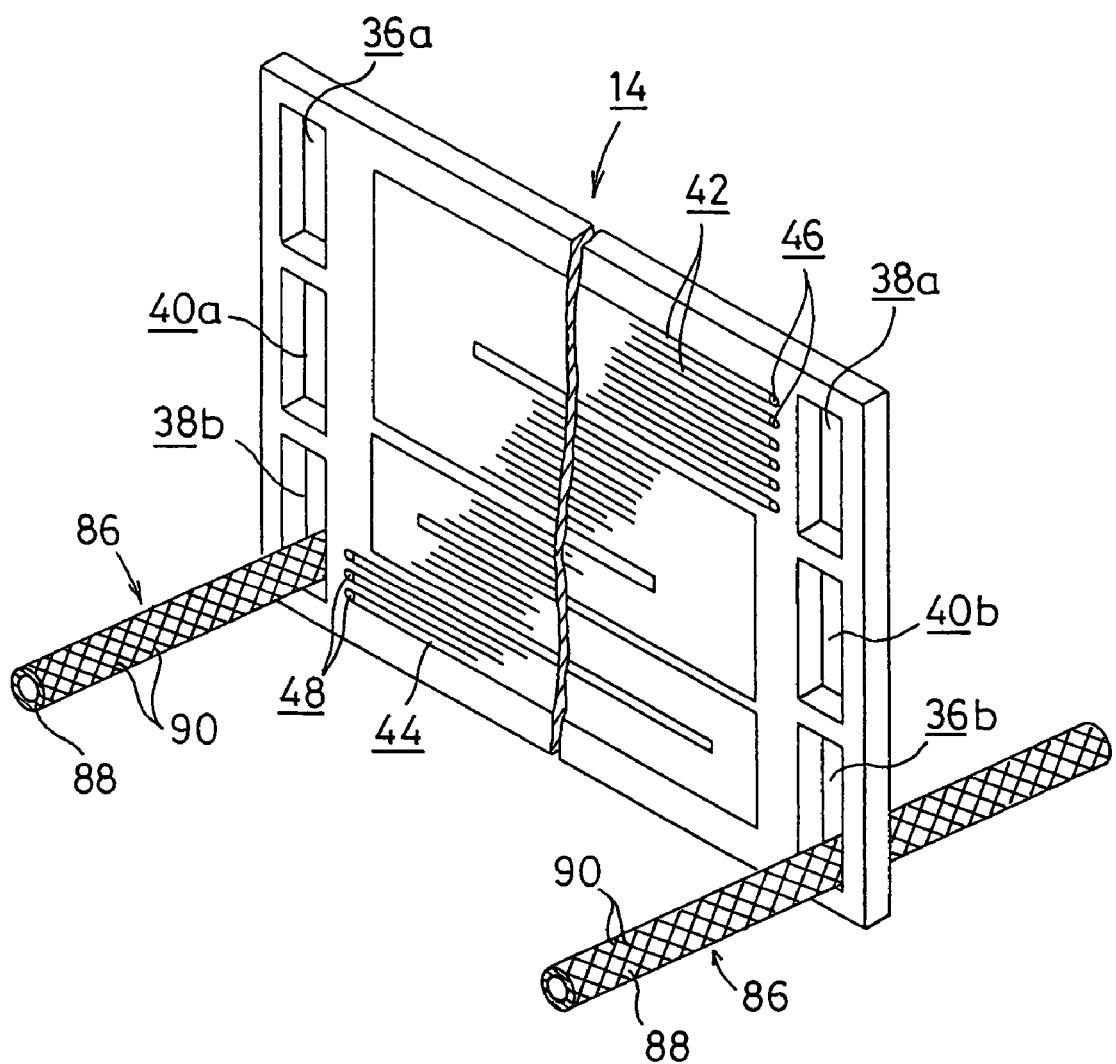

F I G. 10
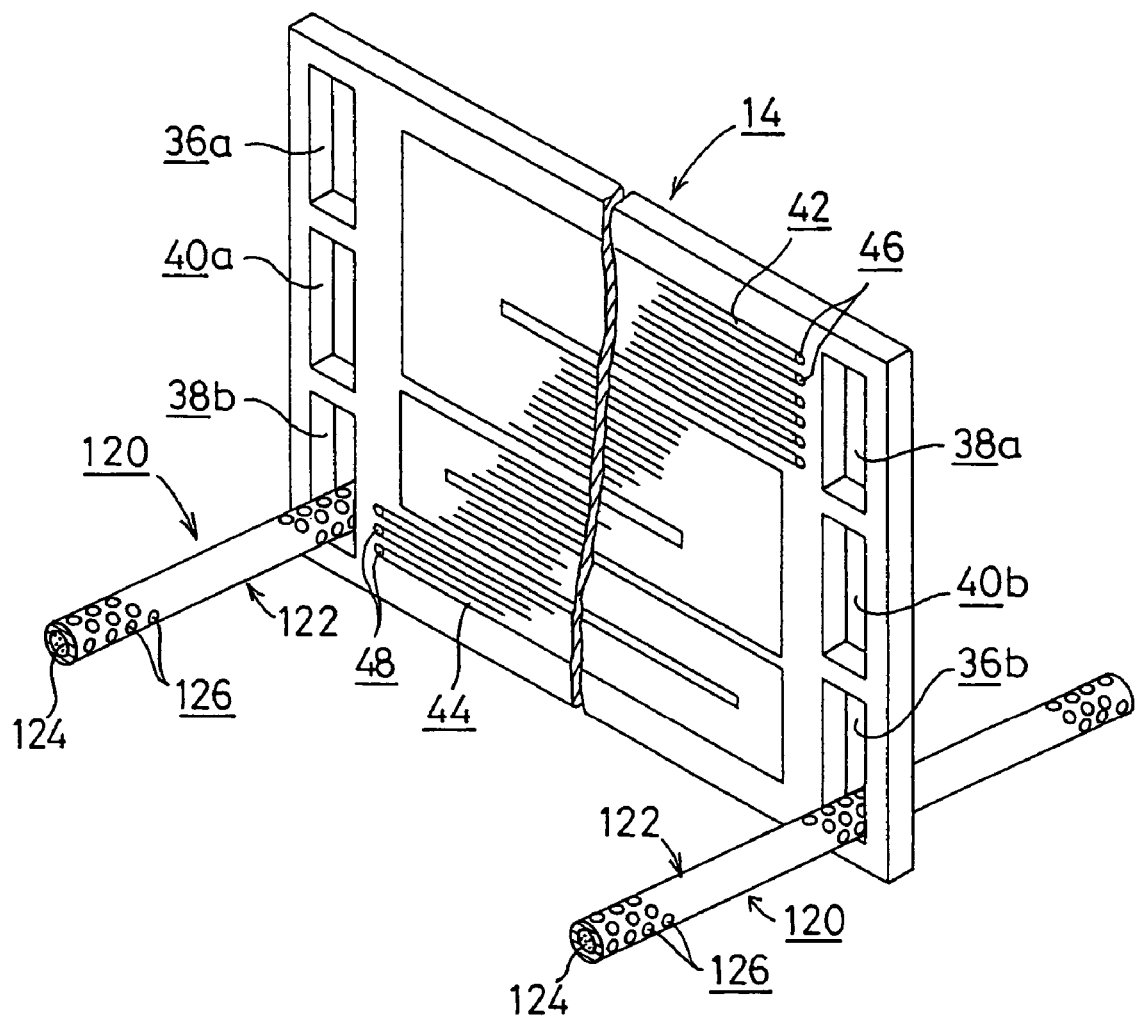

FUEL CELL STACK

BACKGROUND OF THE INVENTION

1. Field of the Invention

The present invention relates to a fuel cell stack which comprises a fuel cell unit composed of a solid polymer ion exchange membrane interposed between an anode electrode and a cathode electrode, and separators for supporting the fuel cell unit interposed therebetween, the fuel cell units and the separators being stacked in the horizontal direction. The fuel cell stack is especially appropriate to be carried on a vehicle.

2. Description of the Related Art

For example, the solid polymer type fuel cell comprises a fuel cell unit including an anode electrode and a cathode electrode disposed opposingly on both sides of an electrolyte composed of a polymer ion exchange membrane (cation exchange membrane) respectively, the fuel cell unit being interposed between separators. Usually, the solid polymer type fuel cell is used as a fuel cell stack obtained by stacking a predetermined number of the fuel cell units.

In such a fuel cell stack, a fuel gas, i.e., a gas principally containing hydrogen (hereinafter referred to as "hydrogen-containing gas") which is supplied to the anode electrode, hydrogen being converted into ion on the catalyst electrode, is moved toward the cathode electrode via the electrolyte which is appropriately humidified. The electron, which is generated during this process, is extracted for an external circuit, and the electron is utilized as DC electric energy. An oxygen-containing gas such as a gas principally containing oxygen (hereinafter referred to as "oxygen-containing gas") or air is supplied to the cathode electrode. Therefore, the hydrogen ion, the electron, and the oxygen are reacted with each other on the cathode electrode, and thus water is produced.

In the fuel cell stack described above, an internal manifold is constructed in order to supply the fuel gas and the oxygen-containing gas (reaction gas) to the anode electrode and the cathode electrode of each of the stacked fuel cell units respectively. Specifically, the internal manifold includes a plurality of communication holes which are provided in an integrated manner to make communication with each of the fuel cell units and the separators which are stacked with each other. When the reaction gas is supplied to the supplying communication hole, the reaction gas is supplied in a dispersed manner to each of the fuel cell units, while the used reaction gas is integrally discharged to the discharging communication hole.

The reaction product water, which is generated on the electrode power-generating surface, tends to be introduced especially into the communication hole through which the oxygen-containing gas flows. Retained water exists in the communication hole in many cases. On the other hand, it is feared that any retained water is generated due to condensation of water vapor or the like in the communication hole through which the fuel gas flows. Therefore, the following inconvenience is pointed out. That is, the communication hole is reduced in cross sectional area or closed by the retained water, and the smooth flow of the reaction gas is prevented. As a result, the power generation performance is deteriorated.

In view of the above, for example, as disclosed in Japanese Laid-Open Patent Publication No. 8-138692, a fuel cell is known, in which hydrophilic coating films are provided for a fuel gas flow passage and an oxygen-containing gas flow passage formed on a stacking surface of a collector electrode. Specifically, as shown in FIG. 28, supply/discharge flow passages 2a, 2b for the fuel gas are formed to penetrate through both side portions of a collector electrode 1. Supply/discharge flow passages 3a, 3b are formed to penetrated through upper and lower portions of the collector electrode 1. A plurality of oxygen-containing gas flow passages 4, which are parallel to one another in the vertical direction, are provided linearly on the side of the power-generating surface of the collector electrode 1. A hydrophilic coating film 5 is formed for the oxygen-containing gas flow passage 4. A porous member 6 is arranged for the oxygen-containing gas supply/discharge flow passage 3b.

In the arrangement as described above, when the water, which is produced on the side of the power-generating surface in accordance with the operation of the fuel cell, is introduced into the oxygen-containing gas flow passages 4, the product water humidifies the hydrophilic coating film 5 formed for the oxygen-containing gas flow passage 4. The product water flows vertically downwardly along the hydrophilic coating film 5 and its surface, and it is discharged from the oxygen-containing gas flow passage 4. Further, the product water is absorbed by the porous member 6 which is arranged for the oxygen-containing gas supply/discharge flow passage 3b. As a result, it is stated that the product water can be reliably discharged from the oxygen-containing gas flow passage 4.

However, in the case of the conventional technique described above, the oxygen-containing gas supply/discharge flow passages 3a, 3b are formed at the upper and lower portions of the collector electrode 1. Therefore, it is difficult to shorten the size of the entire fuel cell in the height direction. Especially, in the case of the use as a fuel cell stack to be carried on a vehicle, it is necessary to effectively utilize the space, e.g., under the floor of the automobile body. It is demanded to shorten the size of the entire fuel cell in the height direction as small as possible. However, the conventional technique described above involves such a problem that it is impossible to effectively respond to the demand.

Further, the oxygen-containing gas supply/discharge flow passages 3a, 3b are formed to be lengthy in the lateral direction at the upper and lower portions of the collector electrode 1. For this reason, in order to ensure the rigidity of the collector electrode 1, it is necessary to set a relatively large thickness of the collector electrode 1. Accordingly, the problem is pointed out that the size of the entire fuel cell stack in the stacking direction is lengthy.

When the size of the entire fuel cell stack in the stacking direction is lengthy, the oxygen-containing gas supply/discharge flow passage 3b becomes long in the stacking direction. The problem also arises that the product water or the like existing at the deep side is difficult to be discharged. Especially, when the fuel cell stack is used to be carried on the vehicle, it is feared that the vehicle runs in an inclined state, and the product water is retained at the deep portion of the oxygen-containing gas supply/discharge flow passage 3b. At that time, the problem arises that the power generation performance is deteriorated because the product water is not discharged.

A technique is disclosed in Japanese Laid-Open Patent Publication No. 10-284096, in which water droplets are prevented from invasion into the power-generating surface by providing a gas branch groove which extends downwardly from a gas inlet of a communication hole. However, when the gas branch groove is provided for the power-generating surface, the amount of gas, which is discharged without contributing to the power generation, is increased. Then, the problem arises such that the ratio of utilization of the reaction gas is lowered, resulting in the decrease in efficiency of the entire system.

A technique is disclosed in U.S. Pat. No. 4,968,566, in which water discharge ports are provided at lower four corner portions of a fuel cell, and the discharge ports are switched depending on a signal of an inclination sensor. However, the problem arises that the structure of the apparatus is considerably complicated.

SUMMARY OF THE INVENTION

A general object of the present invention is to provide a fuel cell which has a function to smoothly and reliably discharge water, and to prevent water in reaction gas flow passage from freezing.

The above and other objects, features, and advantages of the present invention will become more apparent from the following description when taken in conjunction with the accompanying drawings in which a preferred embodiment of the present invention is shown by way of illustrative example.

BRIEF DESCRIPTION OF THE DRAWINGS

FIG. 7 shows a perspective view illustrating a porous water-absorbing tube and the first separator which constitute the fuel cell stack shown in FIG. 1;

FIG. 10 shows a perspective view illustrating a porous water-absorbing tube and a first separator which constitute a fuel cell stack according to a second embodiment of the present invention;

DESCRIPTION OF THE PREFERRED EMBODIMENTS

Figure 1:
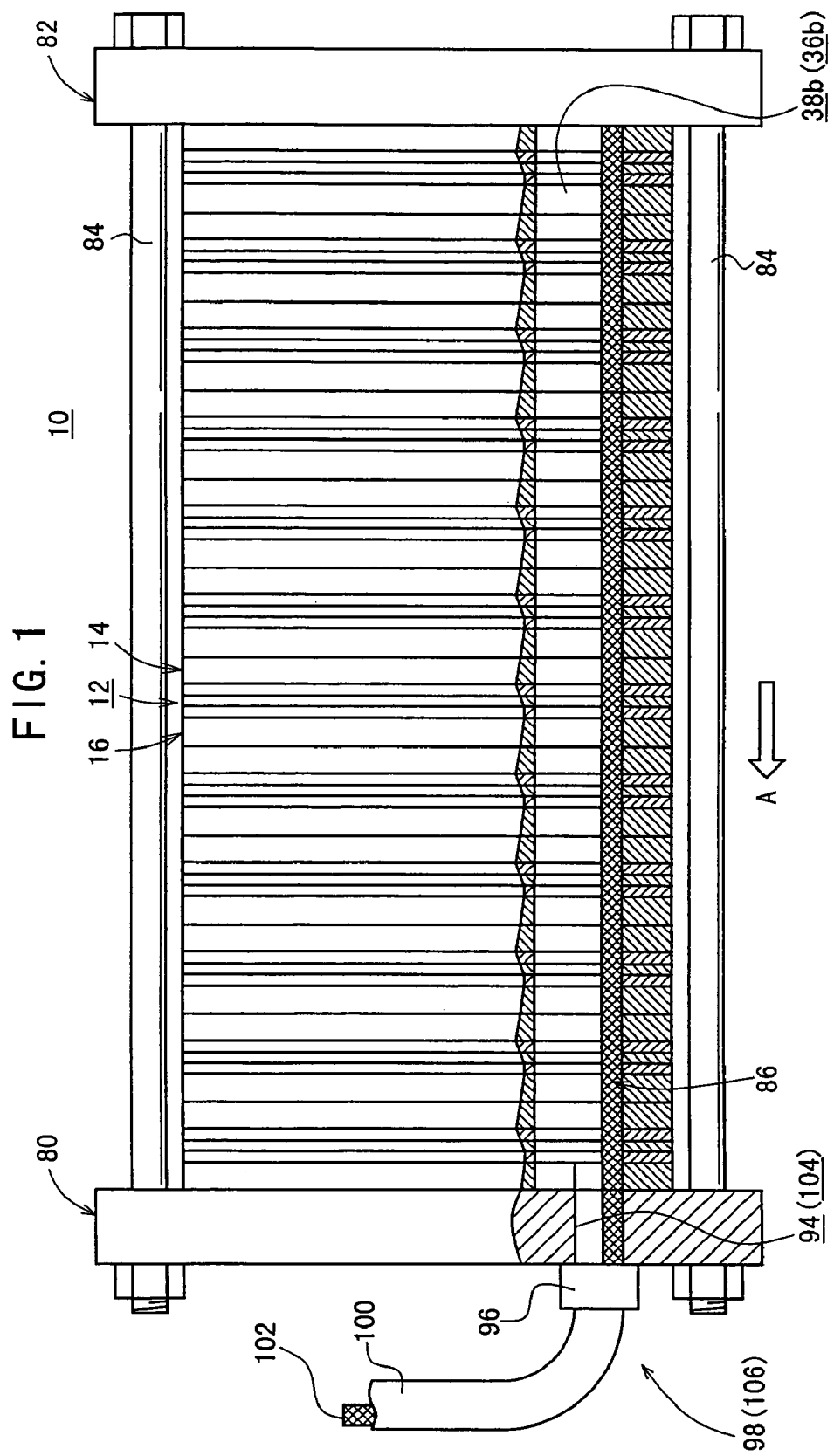
FIG. 1 shows a schematic longitudinal sectional view illustrating a fuel cell stack according to a first embodiment of the present invention.
Figure 2:
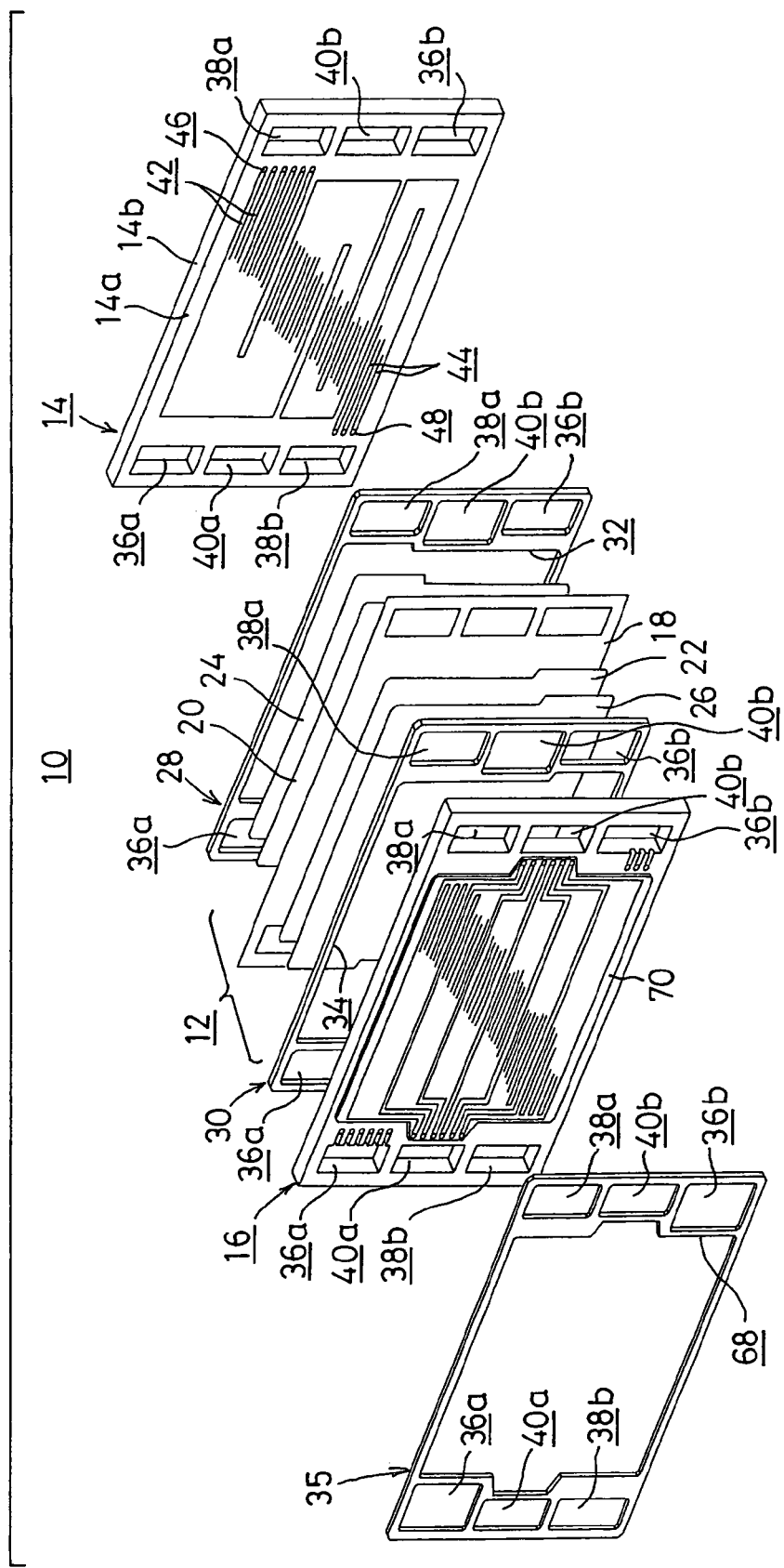
FIG. 2 shows an exploded perspective view illustrating major components of the fuel cell stack shown in FIG. 1.

FIG. 1 shows a schematic longitudinal sectional view illustrating a fuel cell stack 10 according to a first embodiment of the present invention, and FIG. 2 shows an exploded perspective view illustrating major components of the fuel cell stack 10 described above.

The fuel cell stack 10 comprises a fuel cell unit 12, and first and second separators 14, 16 for supporting the fuel cell unit 12 interposed therebetween. A plurality of sets of these components are stacked with each other. The fuel cell unit 12 includes a solid polymer ion exchange membrane 18, and a cathode electrode 20 and an anode electrode 22 which are arranged with the ion exchange membrane 18 intervening therebetween. First and second gas diffusion layers 24, 26, each of which is composed of, for example, porous carbon paper as a porous layer, are arranged for the cathode electrode 20 and the anode electrode 22.

First and second gaskets 28, 30 are provided on both sides of the fuel cell unit 12. The first gasket 28 has a large opening 32 for accommodating the cathode electrode 20 and the first gas diffusion layer 24. On the other hand, the second gasket 30 has a large opening 34 for accommodating the anode electrode 22 and the second gas diffusion layer 26. The fuel cell unit 12 and the first and second gaskets 28, 30 are interposed between the first and second separators 14, 16. A third gasket 35 is arranged for the second separator 16.

The first separator 14 is provided, at its upper portions at the both ends in the lateral direction, with an inlet side fuel gas communication hole 36a for allowing a fuel gas (reaction gas) such as hydrogen gas to pass therethrough, and an inlet side oxygen-containing gas communication hole 38a for allowing an oxygen-containing gas (reaction gas) as a gas containing oxygen or air to pass therethrough.

The first separator 14 is provided, at its central portions at the both ends in the lateral direction, with an inlet side cooling medium communication hole 40a for allowing a cooling medium such as pure water, ethylene glycol, and oil to pass therethrough, and an outlet side cooling medium communication hole 40b for allowing the cooling medium after being used to pass therethrough. The first separator 14 is provided, at its lower portions at the both ends in the lateral direction, with an outlet side fuel gas communication hole 36b for allowing the fuel gas to pass therethrough, and an outlet side oxygen-containing gas communication hole 38b for allowing the oxygen-containing gas to pass therethrough so that the outlet side fuel gas communication hole 36b and the outlet side oxygen-containing gas communication hole 38b are disposed at diagonal positions with respect to the inlet side fuel gas communication hole 36a and the inlet side oxygen-containing gas communication hole 38a respectively.

A plurality of, for example, six of mutually independent first oxygen-containing gas flow passage grooves (gas flow passages) 42, are provided closely to the inlet side oxygen-containing gas communication hole 38a so that they are directed in the direction of the gravity while meandering in the horizontal direction on the surface 14a opposed to the cathode electrode 20 of the first separator 14. The first oxygen-containing gas flow passage grooves 42 are merged into three second oxygen-containing gas flow passage grooves (gas flow passages) 44. The second oxygen-containing gas flow passage grooves 44 extend in the horizontal direction, and terminate at positions close to the outlet side oxygen-containing gas communication hole 38b. The bottom of the second oxygen-containing gas flow passage grooves 44 (the lowest position of the second oxygen-containing gas flow passage grooves 44 in the direction of gravity) is positioned higher than the bottom of the outlet side oxygen-containing gas communication hole 38b by the height h.

Figure 3:
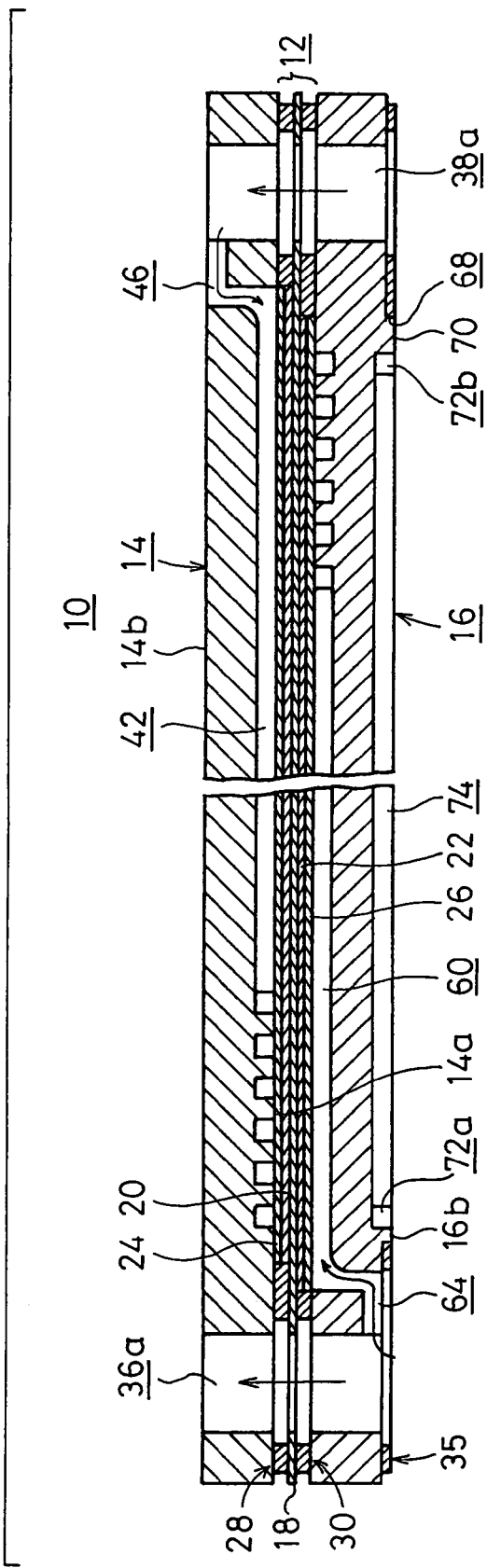
FIG. 3 shows a schematic sectional view illustrating the fuel cell stack shown in FIG. 1.
Figure 4:
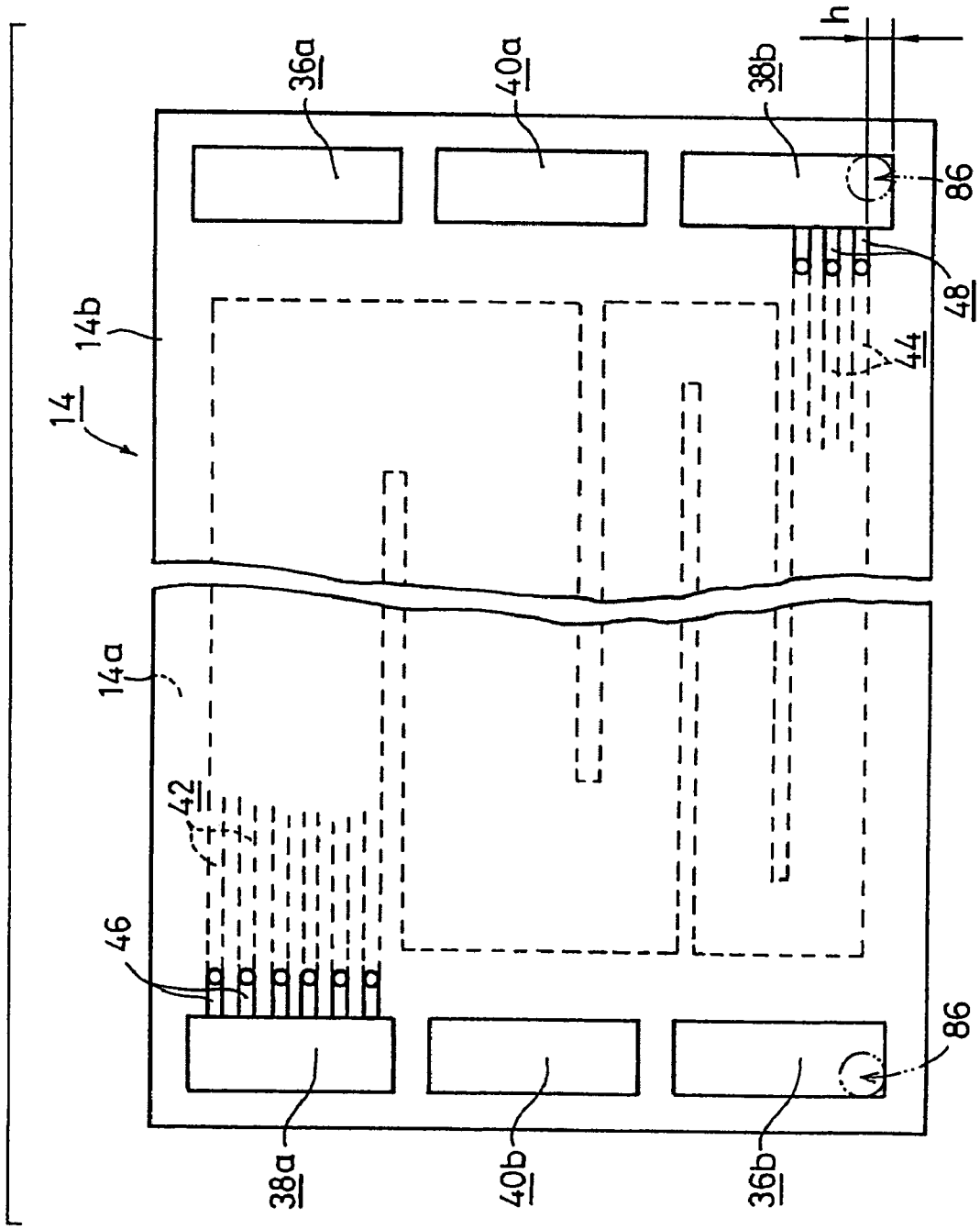
FIG. 4 shows a front view illustrating a first separator which constitutes the fuel cell stack shown in FIG. 1.

As shown in FIGS. 2 to 4, the first separator 14 is provided with first oxygen-containing gas connecting flow passages 46 which penetrate through the first separator 14, which communicate at first ends with the inlet side oxygen-containing gas communication hole 38a on the surface 14b on the side opposite to the surface 14a, and which communicate at second ends with the first oxygen-containing gas flow passage grooves 42 on the side of the surface 14a, and second oxygen-containing gas connecting flow passages 48 which communicate at first ends with the outlet side oxygen-containing gas communication hole 38b on the side of the surface 14b and which communicate at second ends with the second oxygen-containing gas flow passage grooves 44 on the side of the surface 14a to penetrate through the first separator 14.

As shown in FIG. 2, an inlet side fuel gas communication hole 36a, an inlet side oxygen-containing gas communication hole 38a, an inlet side cooling medium communication hole 40a, an outlet side cooling medium communication hole 40b, an outlet side fuel gas communication hole 36b, and an outlet side oxygen-containing gas communication hole 38b are formed at both end portions in the lateral direction of the second separator 16, in the same manner as in the first separator 14.

Figure 5:
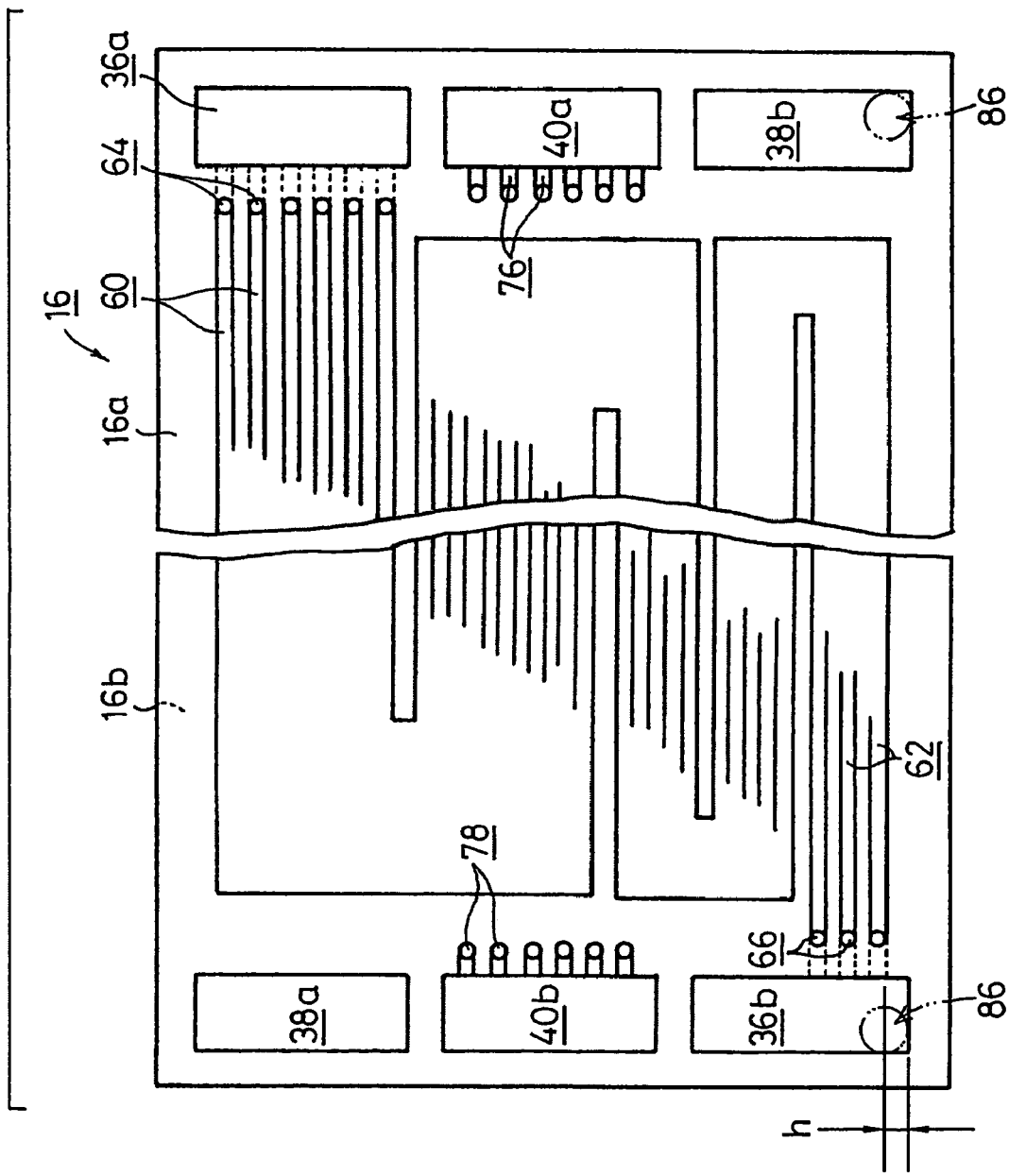
FIG. 5 shows a front view illustrating a first surface of a second separator which constitutes the fuel cell stack shown in FIG. 1.

As shown in FIG. 5, a plurality of, for example, six of first fuel gas flow passage grooves (gas flow passages) 60 are formed closely to the inlet side fuel gas communication hole 36a on the surface 16a of the second separator 16. The first fuel gas flow passage grooves 60 extend in the direction of the gravity while meandering in the horizontal direction, and they are merged into three second fuel gas flow passage grooves (gas flow passages) 62. The second fuel gas flow passage grooves 62 extend in the horizontal direction, and terminate in the vicinity of the outlet side fuel gas communication hole 36b. The bottom of the second fuel gas flow passage grooves 62 (the lowest position of the second fuel gas flow passage grooves 62 in the direction of gravity) is positioned higher than the bottom of the outlet side fuel gas communication hole 36b by the height h.

The second separator 16 is provided with first fuel gas connecting flow passages 64 for communicating the inlet side fuel gas communication hole 36a with the first fuel gas flow passage grooves 60 from the side of the surface 16b, and second fuel gas connecting flow passages 66 for communicating the outlet side fuel gas communication hole 36b with the second fuel gas flow passage grooves 62 from the side of the surface 16b to penetrate through the second separator 16.

Figure 6:
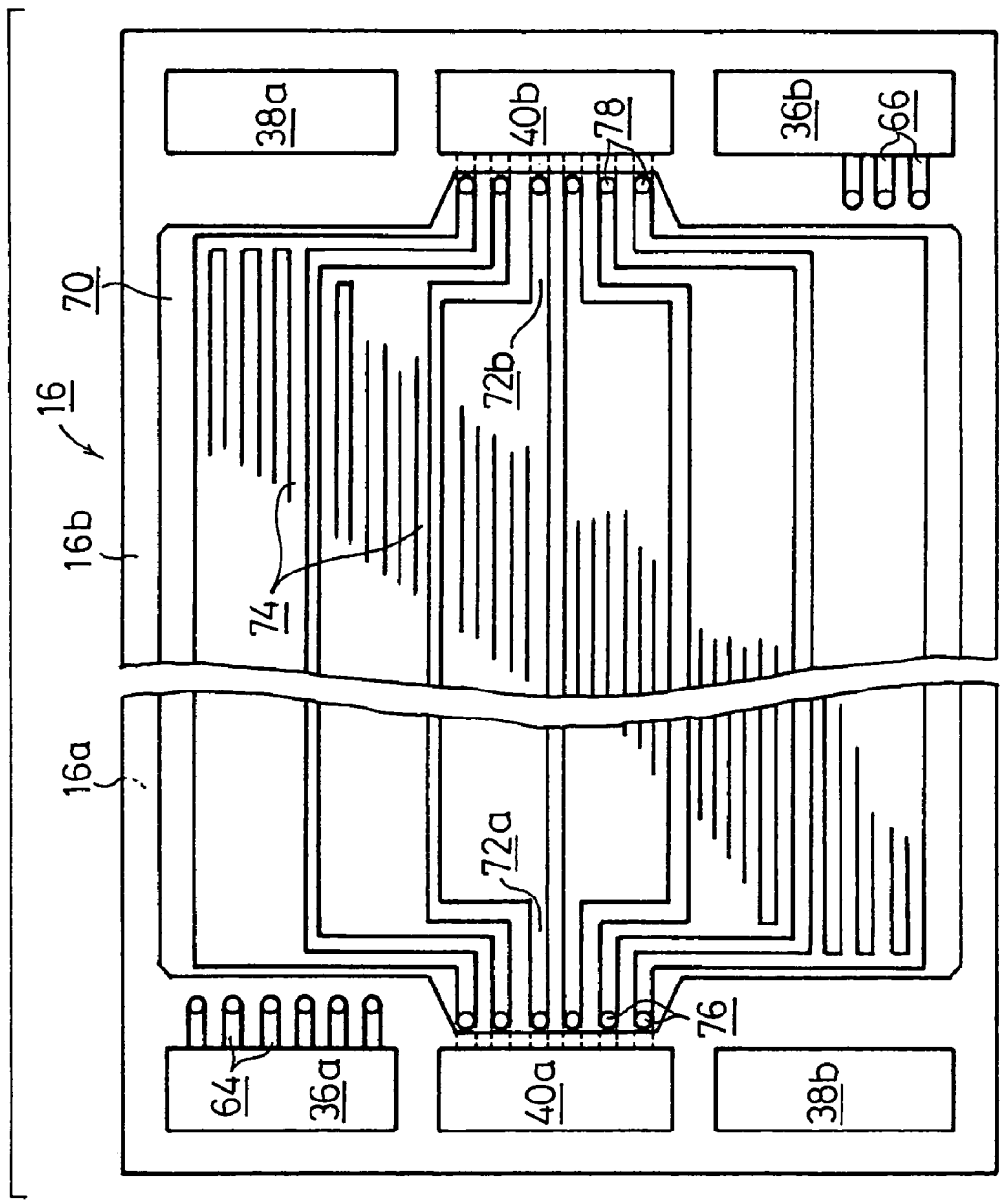
FIG. 6 shows a front view illustrating a second surface of the second separator.

As shown in FIGS. 3 and 6, a stepped section 70, which corresponds to an opening 68 of the third gasket 35, is formed on the surface 16b of the second separator 16. A plurality of main flow passage grooves 72a, 72b for constructing cooling medium flow passages are formed in the stepped section 70 closely to the inlet side cooling medium communication hole 40a and the outlet side cooling medium communication hole 40b. Branched flow passage grooves 74, which are branched into a plurality of individuals respectively, are provided to extend in the horizontal direction between the main flow passage grooves 72a, 72b.

The second separator 16 is provided with first cooling medium connecting flow passages 76 for making communication between the inlet side cooling medium communication hole 40a and the main flow passage grooves 72a, and second cooling medium connecting flow passages 78 for making communication between the outlet side cooling medium communication hole 40b and the main flow passage grooves 72b to penetrate through the second separator 16.

As shown in FIG. 2, an inlet side fuel gas communication hole 36a, an inlet side oxygen-containing gas communication hole 38a, an inlet side cooling medium communication hole 40a, an outlet side cooling medium communication hole 40b, an outlet side fuel gas communication hole 36b, and an outlet side oxygen-containing gas communication hole 38b are provided at both end portions in the lateral direction of each of the first, second, and third gaskets 28, 30, 35.

As shown in FIG. 1, first and second end plates 80, 82 are arranged at both ends in the stacking direction of the fuel cell units 12 and the first and second separators 14, 16. The first and second end plates 80, 82 are integrally tightened and fastened by the aid of tie rods 84.

A porous water-absorbing tube 86 is arranged to extend in the stacking direction for at least the outlet side oxygen-containing gas communication holes 38b and optionally for the outlet side fuel gas communication holes 36b in the fuel cell stack 10. As shown in FIGS. 1 and 7, the porous water-absorbing tube 86 includes a pipe-shaped core member 88 which is made of metal, for example, SUS (stainless steel), and a plurality of wire members 90 which are wound around the outer circumference of the core member 88.

Figure 8:
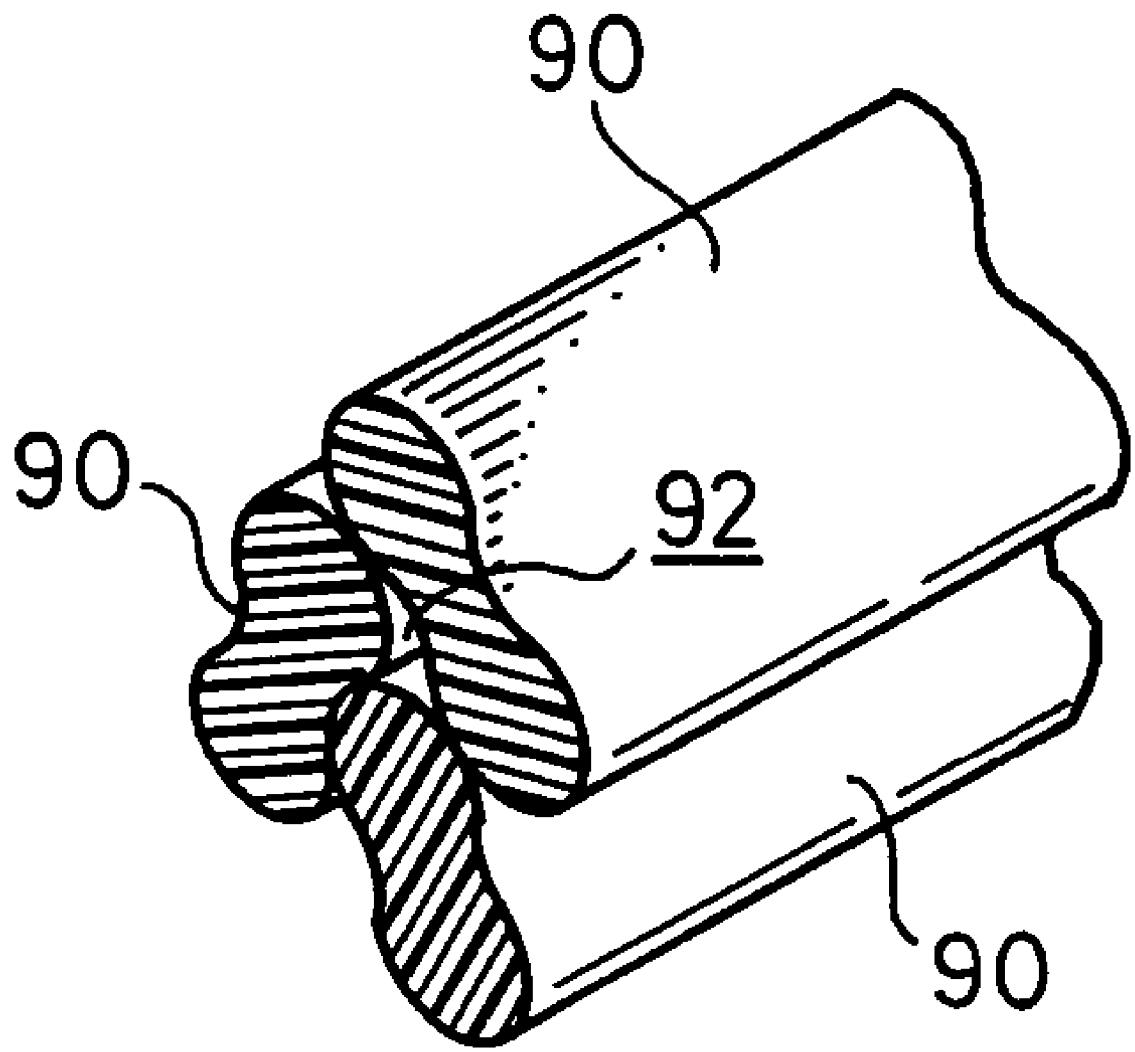
FIG. 8 shows a perspective view with partial cross section illustrating wire members which constitute the porous water-absorbing tube.

As shown in FIG. 8, the wire member 90 has irregularities on the surface. The respective wire members 90 are bundled, and thus a space 92 is formed. The space 92 extends in the longitudinal direction of the core member 88 (in the stacking direction of the fuel cell stack 10). Both ends of the core member 88 may be closed. The core member 88 is fixed in the fuel cell stack 10 by the aid of an unillustrated fixing means.

As shown in FIGS. 4 and 5, the porous water-absorbing tubes 86 are installed on the lower side in the direction of the gravity at the positions separated from the second oxygen-containing gas connecting flow passages 48 and the second fuel gas connecting flow passages 66, in the outlet side oxygen-containing gas communication holes 38b and the outlet side fuel gas communication holes 36b.

As shown in FIG. 1, the first end plate 80 is formed with a hole 94 which communicates with the outlet side oxygen-containing gas communication hole 38b. A manifold tube 98, which communicates with the hole 94, is connected to the first end plate 80 via a joint 96. The manifold tube 98 is provided with an outer tube 100 which is bent upwardly from the joint 96. A porous water-absorbing tube 102, which is connected to the porous water-absorbing tube 86 or which is elongated from the porous water-absorbing tube 86, is arranged in the outer tube 100. The porous water-absorbing tube 102 is connected, for example, to a water storage tank (not shown) for storing water which is usable to humidify and reform the gas.

The first end plate 80 is formed with a hole 104 which communicates with the outlet side fuel gas communication hole 36b. A manifold tube 106, which is constructed in the same manner as the manifold tube 98 described above, is connected to the hole 104, detailed explanation of which is omitted.

The operation of the fuel cell stack 10 according to the first embodiment constructed as described above will be explained below.

The fuel gas, for example, the gas containing hydrogen obtained by reforming hydrocarbon is supplied to the inside of the fuel cell stack 10, and the air or the gas containing oxygen as the oxygen-containing gas (hereinafter simply referred to as "air") is supplied thereto. Further, the cooling medium is supplied in order to cool the power-generating surface of the fuel cell unit 12. As shown in FIGS. 3 and 5, the fuel gas, which is supplied to the inlet side fuel gas communication hole 36a in the fuel cell stack 10, is moved from the side of the surface 16b to the side of the surface 16a via the first fuel gas connecting flow passages 64. The fuel gas is supplied to the first fuel gas flow passage grooves 60 which are formed on the side of the surface 16a.

The fuel gas, which is supplied to the first fuel gas flow passage grooves 60, is moved in the direction of the gravity while meandering in the horizontal direction along the surface 16a of the second separator 16. During this process, the hydrogen-containing gas in the fuel gas passes through the second gas diffusion layer 26, and it is supplied to the anode electrode 22 of the fuel cell unit 12. The unreacted fuel gas is supplied to the anode electrode 22 while being moved along the first fuel gas flow passage grooves 60. On the other hand, the fuel gas, which is not used, passes through the second fuel gas flow passage grooves 62, and it is introduced into the second fuel gas connecting flow passages 66. The fuel gas is moved toward the side of the surface 16b, and then it is discharged to the outlet side fuel gas communication hole 36b.

As shown in FIG. 3, the air, which is supplied to the inlet side oxygen-containing gas communication hole 38a in the fuel cell stack 10, is introduced into the first oxygen-containing gas flow passage grooves 42 via the first oxygen-containing gas connecting flow passages 46 which communicate with the inlet side oxygen-containing gas communication hole 38a of the first separator 14. As shown in FIG. 2, the air, which is supplied to the first oxygen-containing gas flow passage grooves 42, is moved in the direction of the gravity while meandering in the horizontal direction. During this process, the oxygen-containing gas in the air is supplied from the first gas diffusion layer 24 to the cathode electrode 20. On the other hand, the air, which is not used, passes through the second oxygen-containing gas flow passage grooves 44, and it is discharged from the second oxygen-containing gas connecting flow passages 48 to the outlet side oxygen-containing gas communication hole 38b. Accordingly, the electric power is generated in the fuel cell unit 12. For example, the electric power is supplied to an unillustrated motor.

Further, the cooling medium, which is supplied to the inside of the fuel cell stack 10, is introduced into the inlet side cooling medium communication hole 40a, and then it is supplied to the main flow passage grooves 72a on the side of the surface 16b via the first cooling medium connecting flow passages 76 of the second separator 16 as shown in FIG. 6. The cooling medium passes through the plurality of branched flow passage grooves 74 which are branched from the main flow passage grooves 72a to cool the power-generating surface of the fuel cell unit 12, followed by being merged into the main flow passage grooves 72b. The cooling medium after the use passes through the second cooling medium connecting flow passages 78, and it is discharged from the outlet side cooling medium communication hole 40b.

During the period in which the fuel cell stack 10 is operated as described above, a relatively large amount of water is produced especially on the side of the cathode electrode 20. The water is discharged to the outlet side oxygen-containing gas communication hole 38b via the first and second oxygen-containing gas flow passage grooves 42, 44.

Figure 9:
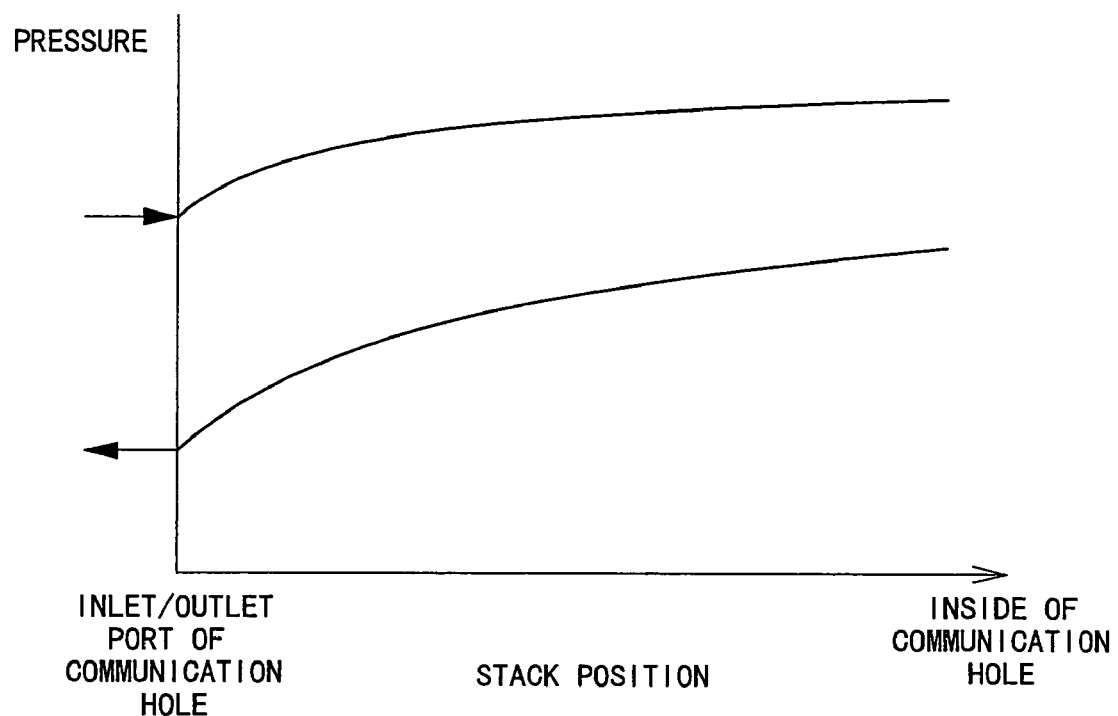
FIG. 9 illustrates a static pressure distribution in the fuel cell stack shown in FIG. 1.

In this case, in the first embodiment, the porous water-absorbing tube 86 is arranged for the outlet side oxygen-containing gas communication hole 38b. The water, which is introduced into the outlet side oxygen-containing gas communication hole 38b, is transmitted in accordance with the capillary phenomenon through the plurality of wire members 90 which constitute the porous water-absorbing tube 86. The water is introduced into the space 92 formed among the wire members 90. In the fuel cell stack 10, the oxygen-containing gas and the fuel gas have the static pressure distribution as shown in FIG. 9. Accordingly, the pressure on the outlet side of the outlet side oxygen-containing gas communication hole 38b is lower than the pressure on the inner side. The water, which is introduced into the space 92 of the porous water-absorbing tube 86, is extruded by the difference in pressure between upper and lower streams of air toward the first end plate 80, i.e., toward the manifold tube 98 as shown by the direction of the arrow A in FIG. 1.

Accordingly, in the first embodiment, the water, which is introduced into the outlet side oxygen-containing gas communication hole 38b, is discharged smoothly and reliably toward the porous water-absorbing tube 102 in the manifold tube 98 owing to the capillary phenomenon of the porous water-absorbing tube 86 and the difference in pressure of air in the outlet side oxygen-containing gas communication hole 38b. According to the simple structure, an effect is obtained that the drainage performance for the retained condensed water such as the product water is effectively improved.

Especially, when the fuel cell stack 10 is carried on the vehicle, even if the fuel cell stack 10 is inclined, for example, due to any inclination of the running road, then the water, which is introduced into the outlet side oxygen-containing gas communication hole 38b, makes no back flow toward the second oxygen-containing gas flow passage groove 44. Therefore, the following advantage is obtained. That is, it is possible to prevent the electrode power-generating surface from being covered with the product water in the fuel cell stack 10, and it is also possible to reliably avoid the deterioration of the power generation performance.

Further, as shown in FIG. 4, the porous water-absorbing tube 86 is arranged on the lower side in the direction of the gravity of the outlet side oxygen-containing gas communication hole 38b at the position separated from the second oxygen-containing gas connecting flow passages 48. Accordingly, the water-absorbing performance for the product water is improved. It is also possible to avoid the disturbance of the flow distribution of the air on the side of the electrode power-generating surface of the first separator. Further, the pressure loss of the air is not increased in the outlet side oxygen-containing gas communication hole 38b.

As shown in FIG. 1, the manifold tube 98 is bent upwardly. The porous water-absorbing tube 102, which is arranged in the manifold tube 98, is arranged at the position higher than the outlet side oxygen-containing gas communication hole 38b. Accordingly, it is possible to make the layout of the manifold tube 98 in the plane of the first end plate 80. The size of the entire fuel cell stack 10 in the height direction is not increased. Therefore, the following advantage is obtained. That is, the degree of freedom of the piping layout is improved. It is possible to effectively shorten the size in the height direction of the entire fuel cell stack 10. The fuel cell stack 10 is especially excellent when it is carried on the vehicle.

In the first embodiment, as shown in FIG. 2, the inlet side fuel gas communication hole 36a, the inlet side oxygen-containing gas communication hole 38a, the inlet side cooling medium communication hole 40a, the outlet side cooling medium communication hole 40b, the outlet side fuel gas communication hole 36b, and the outlet side oxygen-containing gas communication hole 38b are provided at the both end portions in the lateral direction of the fuel cell stack 10. Accordingly, it is unnecessary to provide any lengthy communication hole in the lateral direction, at upper and lower portions of the fuel cell stack 10. The size in the height direction of the entire fuel cell stack 10 can be as short as possible, and the strength is also improved. Therefore, it is possible to effectively make thinner the size of the entire fuel cell stack 10 in the stacking direction.

As shown in FIG. 4, the lowest position of the second oxygen-containing gas flow passage grooves 44 is higher than the bottom of the outlet side oxygen-containing gas communication hole 38b by the height h. Thus, even if the water produced in the power generation is trapped in the outlet side oxygen-containing gas communication hole 38b, the water does not flow back into the second oxygen-containing gas flow passage grooves 44. The second oxygen-containing gas flow passage grooves 44 are not blocked by the water undesirably. The water is smoothly discharged from the second oxygen-containing gas flow passage grooves 44. In particular, when operation of the fuel cell stack 10 is started at a low temperature, water does not freeze in the second oxygen-containing gas flow passage grooves 44. Therefore, the second oxygen-containing gas flow passage grooves 44 are not blocked by the frozen water.

In the first embodiment, explanation has been made for those disposed on the side of the outlet side oxygen-containing gas communication hole 38b. The condensed water is similarly produced on the side of the outlet side fuel gas communication hole 36b as well. It is possible to provide the efficient and reliable drainage function by using the porous water-absorbing tube 86. Although the porous water-absorbing tube 86 has the pipe-shaped core member 88, it is also preferable to use a rod-shaped member alternatively.

In the first embodiment, the first and second oxygen-containing gas flow passage grooves 42, 44, which are the gas flow passage grooves, are provided in the direction of the gravity while meandering in the horizontal direction on the surface 14a of the first separator 14. On the other hand, the first and second fuel gas flow passage grooves 60, 62, which are the gas flow passages, are provided in the direction of the gravity while meandering in the horizontal direction on the surface 16a of the second separator 16. Alternatively, the respective gas flow passages may be provided in the direction of the antigravity while meandering in the horizontal direction on the surfaces 14a, 16a of the first and second separators 14, 16. In this arrangement, the porous water-absorbing tubes 86 are arranged on the upper side of the first and second separators 14, 16. However, the same effect is obtained, for example, that the drainage performance for the retained condensed water is effectively improved owing to the capillary phenomenon of the porous water-absorbing tube 86 and the difference in pressure of air or the like. The pattern of the gas flow passages is not limited to the serpentine pattern. Alternatively, straight gas flow passages may be suitably employed depending on the application.

FIG. 10 shows a perspective view illustrating a porous water-absorbing tube 120 and a first separator 14 which constitute a fuel cell stack according to a second embodiment of the present invention. The same constitutive components as those of the fuel cell stack 10 according to the first embodiment are designated by the same reference numerals, detailed explanation of which will be omitted. Explanation will be made in the second embodiment and the following described below in the same manner as described above.

The porous water-absorbing tube 120 comprises a pipe member 122 made of metal, for example, SUS, and a plurality of wire members 124 accommodated in the pipe member 122. The pipe member 122 has a plurality of holes 126 on the outer circumference. The water can be penetrated through the holes 126 into the pipe member 122. The surface configuration of the wire member 124 is irregular in the same manner as in the wire member 90.

Figure 11:
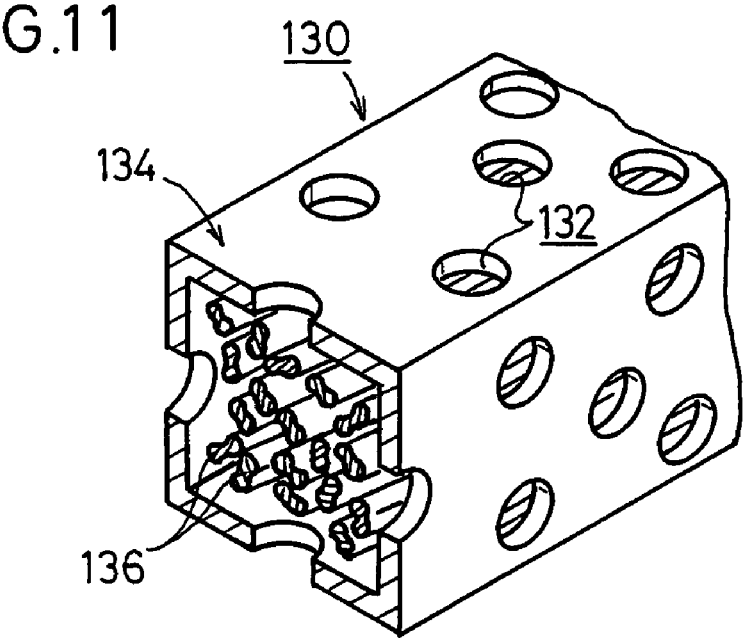
FIG. 11 shows a partial perspective view illustrating a porous water-absorbing tube which constitutes a fuel cell stack according to a third embodiment of the present invention.
Figure 12:
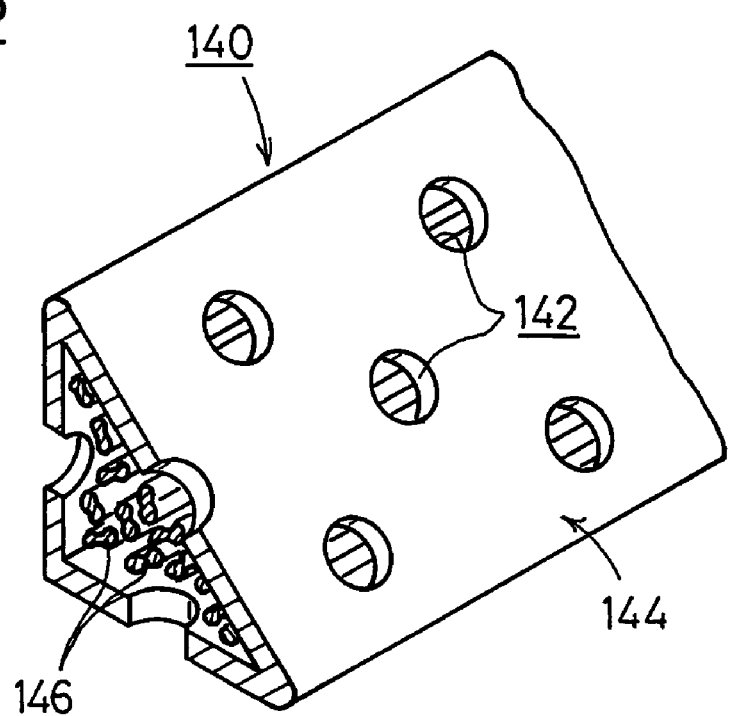
FIG. 12 shows a partial perspective view illustrating a porous water-absorbing tube which constitutes a fuel cell stack according to a fourth embodiment of the present invention.

FIG. 11 shows a partial perspective view illustrating a porous water-absorbing tube 130 which constitutes a fuel cell stack according to a third embodiment of the present invention, and FIG. 12 shows a partial perspective view illustrating a porous water-absorbing tube 140 which constitutes a fuel cell stack according to a fourth embodiment of the present invention.

The porous water-absorbing tube 130 has a large number of holes 132, comprising an angular pipe member 134 having a square cross section, and a plurality of wire members 136 arranged in the angular pipe member 134. The porous water-absorbing tube 140 has a large number of holes 142, comprising a triangular pipe member 144 having a triangular cross section, and a plurality of wire members 146 arranged in the triangular pipe member 144. The angular pipe member 134 and the triangular pipe member 144 are arranged along the shape of the corners of the outlet side oxygen-containing gas communication hole 38b and the outlet side fuel gas communication hole 36b.

In the porous water-absorbing tubes 120, 130, 140 constructed as described above, the water permeates through the respective holes 126, 132, 142. The same effect as that obtained in the first embodiment is obtained. That is, for example, it is possible to discharge the water smoothly and reliably owing to the capillary phenomenon of the plurality of wire members 124, 136, 146 and the difference in pressure of air.

Figure 13:
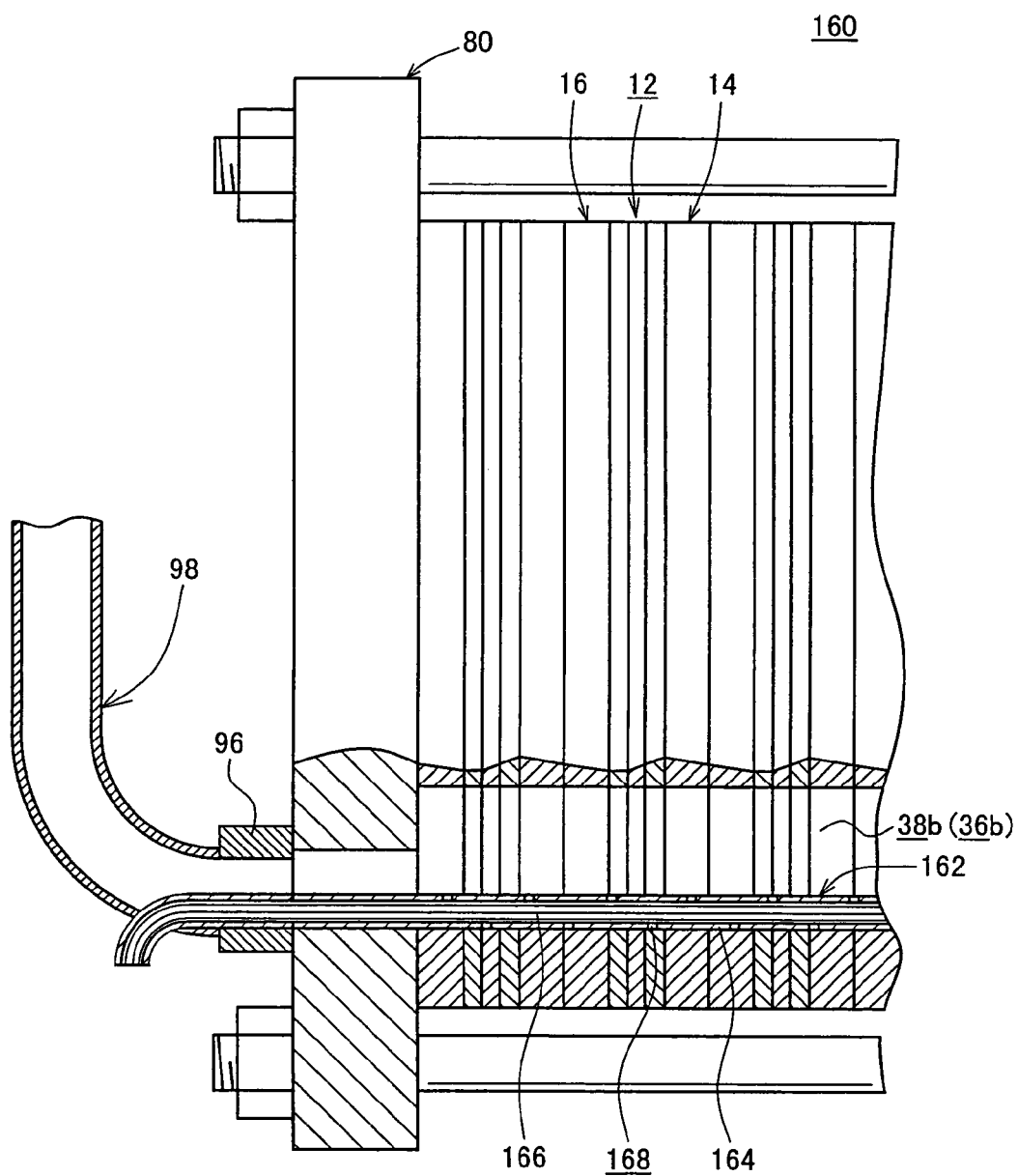
FIG. 13 shows a longitudinal sectional view illustrating a fuel cell stack according to a fifth embodiment of the present invention.

FIG. 13 shows a longitudinal sectional view illustrating a fuel cell stack 160 according to a fifth embodiment of the present invention. In the fuel cell stack 160, porous water-absorbing tubes 162 are arranged for the outlet side oxygen-containing gas communication hole 38b and the outlet side fuel gas communication hole 36b. The porous water-absorbing tube 162 comprises a pipe member 164 and a plurality of wire members 166 arranged at the inside of the pipe member 164.

The pipe member 164 is provided with a plurality of holes 168 which are formed at portions to be arranged at the outlet side oxygen-containing gas communication hole 38b and the outlet side fuel gas communication hole 36b, making it possible to effect the permeation of water. On the other hand, no hole is provided at the portion exposed to the outside of the fuel cell stack 160. The pipe member 164 is constructed in an integrated manner. However, it is also preferable that a tube provided with the holes 168 and a tube having no hole are separately provided, and they are fixed by means of a joint or the like. It is also preferable to use a variety of water-absorbing members in place of the wire member 166.

Figure 14:
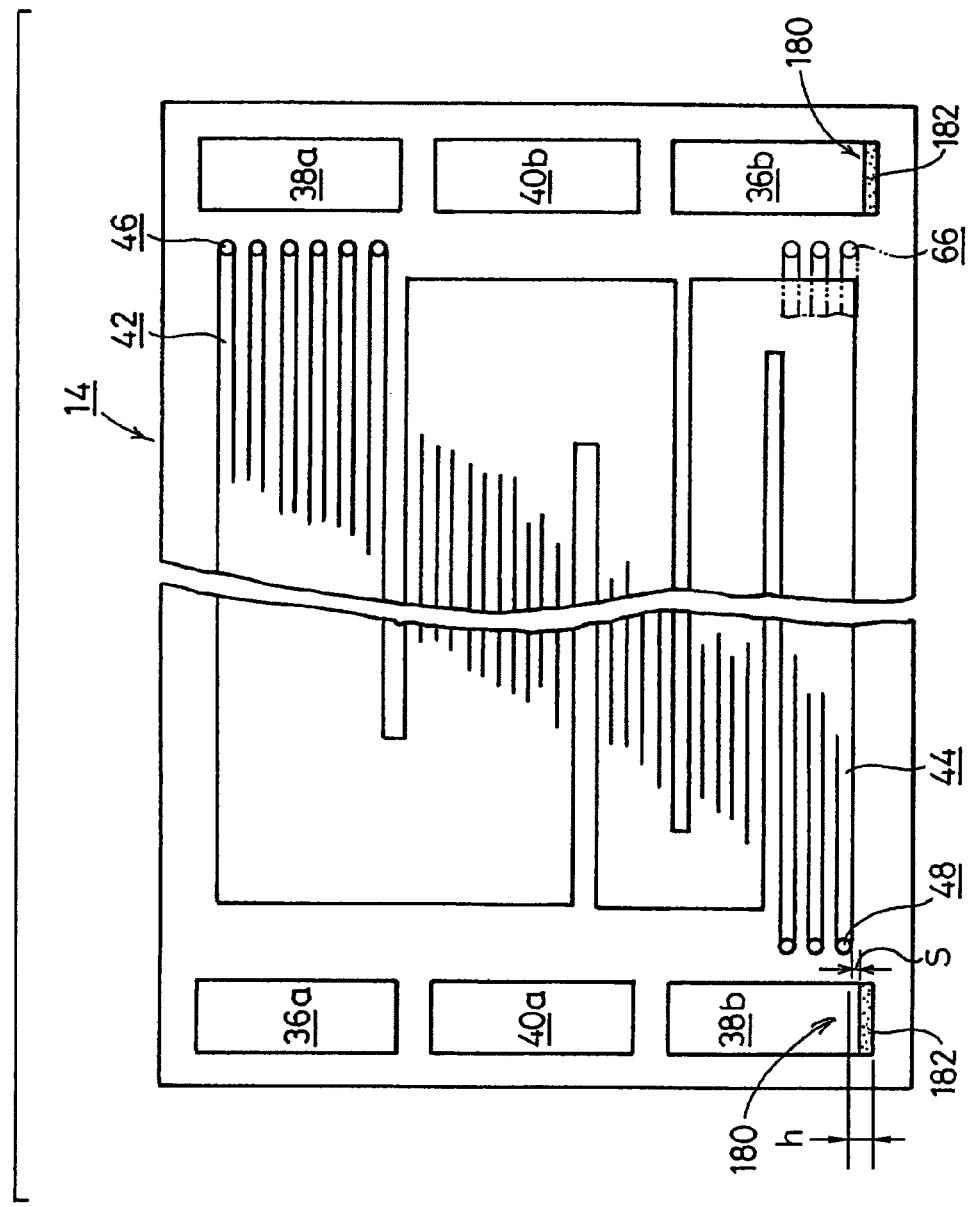
FIG. 14 shows a vertical sectional view illustrating a porous water-absorbing tube which constitutes a fuel cell stack according to a sixth embodiment of the present invention.

FIG. 14 shows a vertical sectional view illustrating a porous water-absorbing tube 180 which constitutes a fuel cell stack according to a sixth embodiment of the present invention. The porous water-absorbing tube 180 comprises a water-absorbing member 182 having a solid cross section which is embedded on the lower side in the direction of the gravity of each of the outlet side oxygen-containing gas communication hole 38b and the outlet side fuel gas communication hole 36b. The water-absorbing member 182 is composed of, for example, sponge. The upper surface of the water-absorbing member 182 is set at the position to provide a predetermined gap S from the second oxygen-containing gas connecting flow passage 48 and the second fuel gas connecting flow passage 66. It is possible to avoid any back flow of water. If the water-absorbing member 182 is not used, the bottom of the outlet side oxygen-containing gas communication hole 38b and the bottom of the outlet side fuel gas communication hole 36b are spaced from the second oxygen-containing gas connecting-flow passage 48 and the second fuel gas connecting flow passage 66 by the height h, respectively. Thus, the back flow of water is prevented, and the water does not freeze in the gas flow passages.

Figure 15:
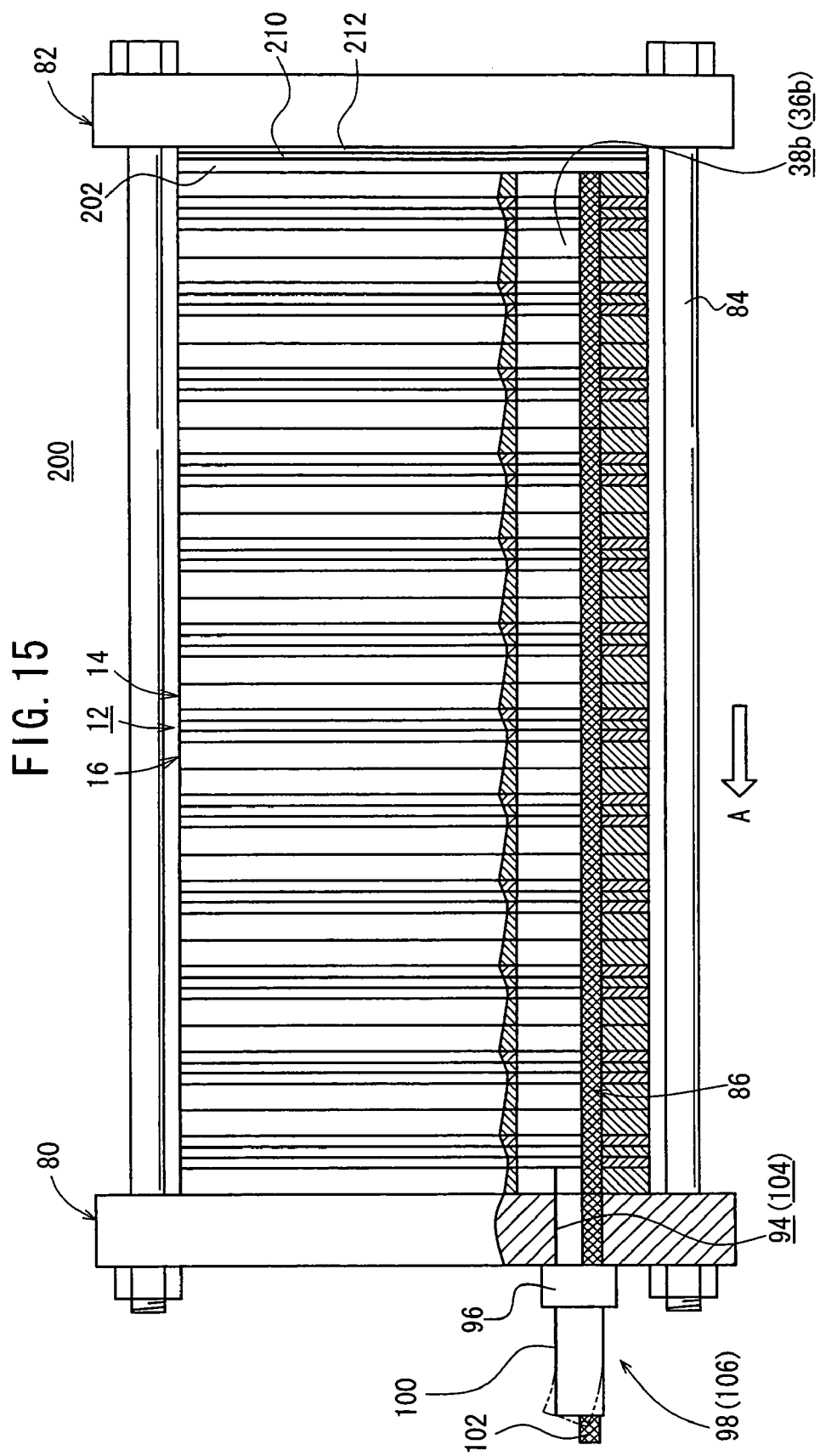
FIG. 15 shows a schematic longitudinal sectional view illustrating a fuel cell stack according to a seventh embodiment of the present invention.

FIG. 15 shows a schematic longitudinal sectional view illustrating a fuel cell stack 200 according to a seventh embodiment of the present invention.

Figure 16:
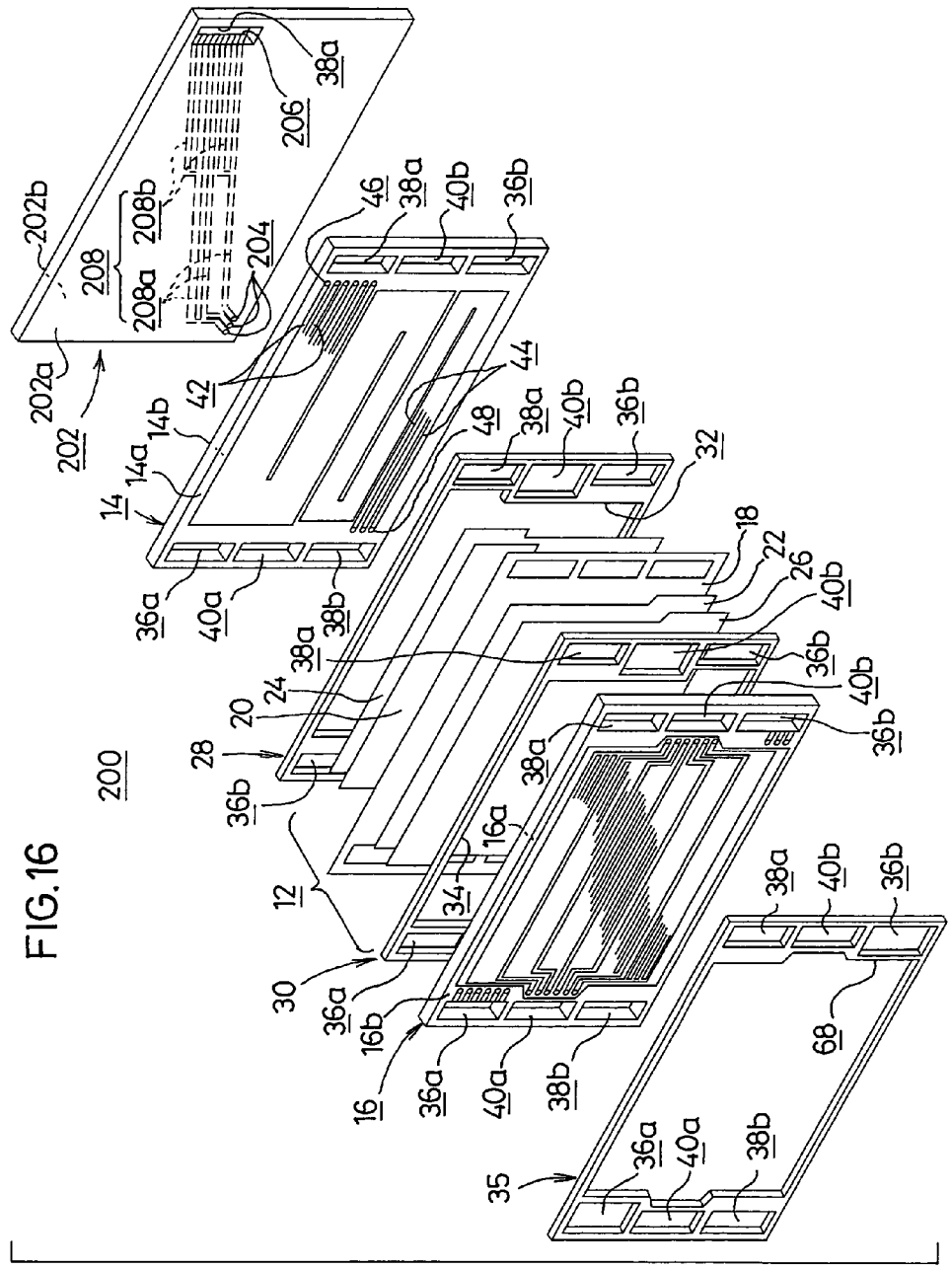
FIG. 16 shows an exploded perspective view illustrating major components of the fuel cell stack.
Figure 17:
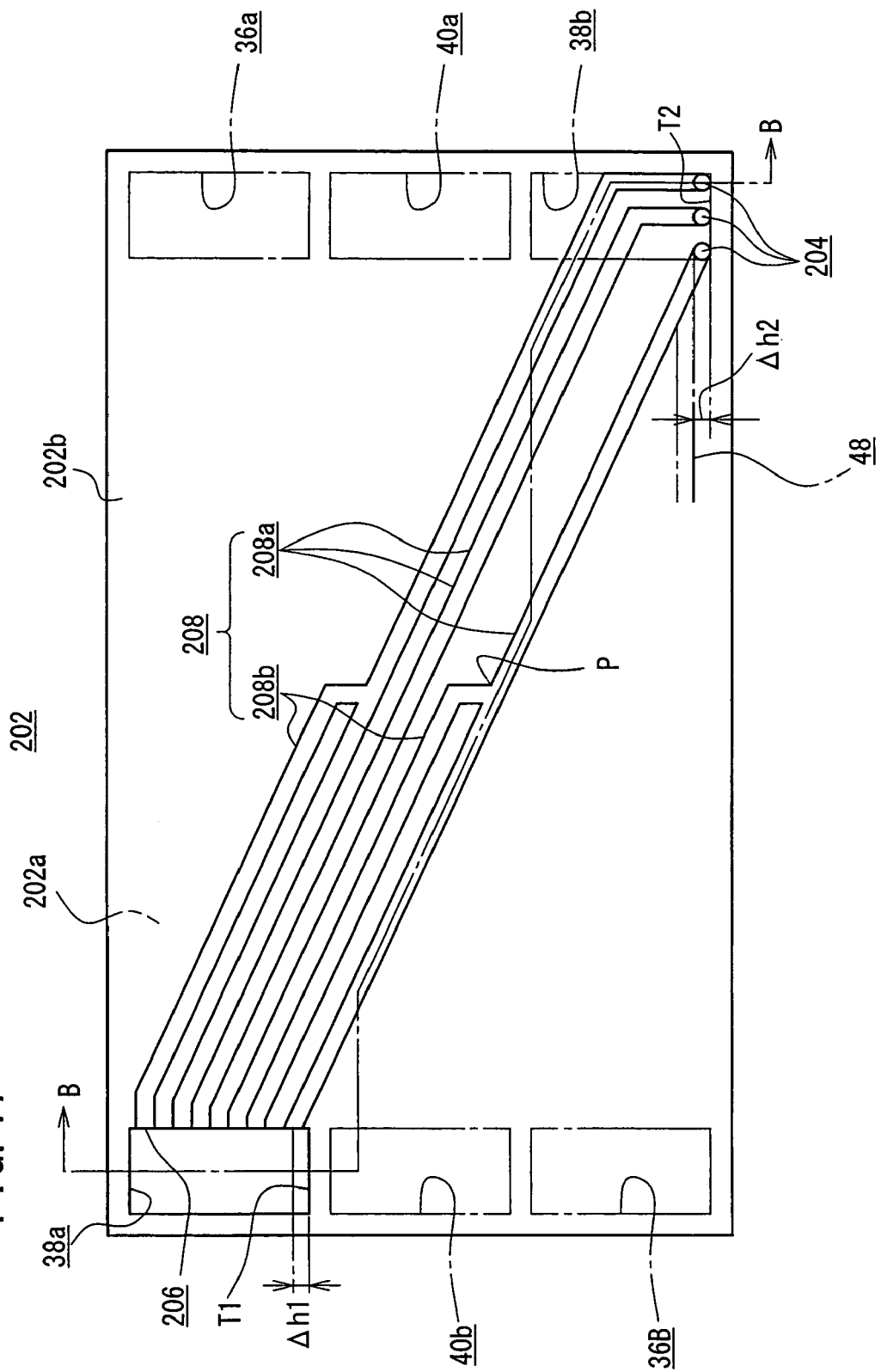
FIG. 17 shows a front view illustrating a first surface of a bypass plate.
Figure 18:
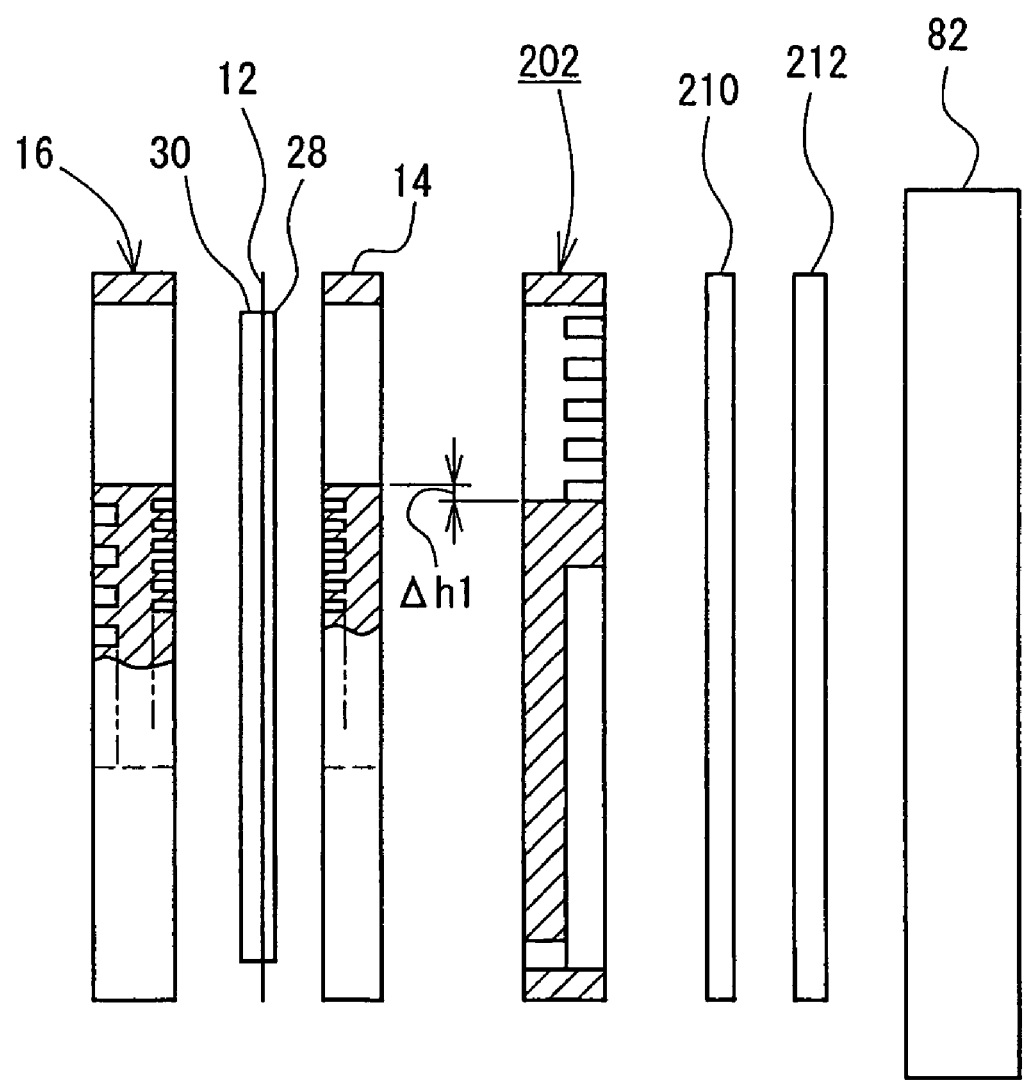
FIG. 18 shows a sectional view of the bypass plate taken along a line B-B shown in FIG. 17 and an exploded side view of other members.
Figure 19:
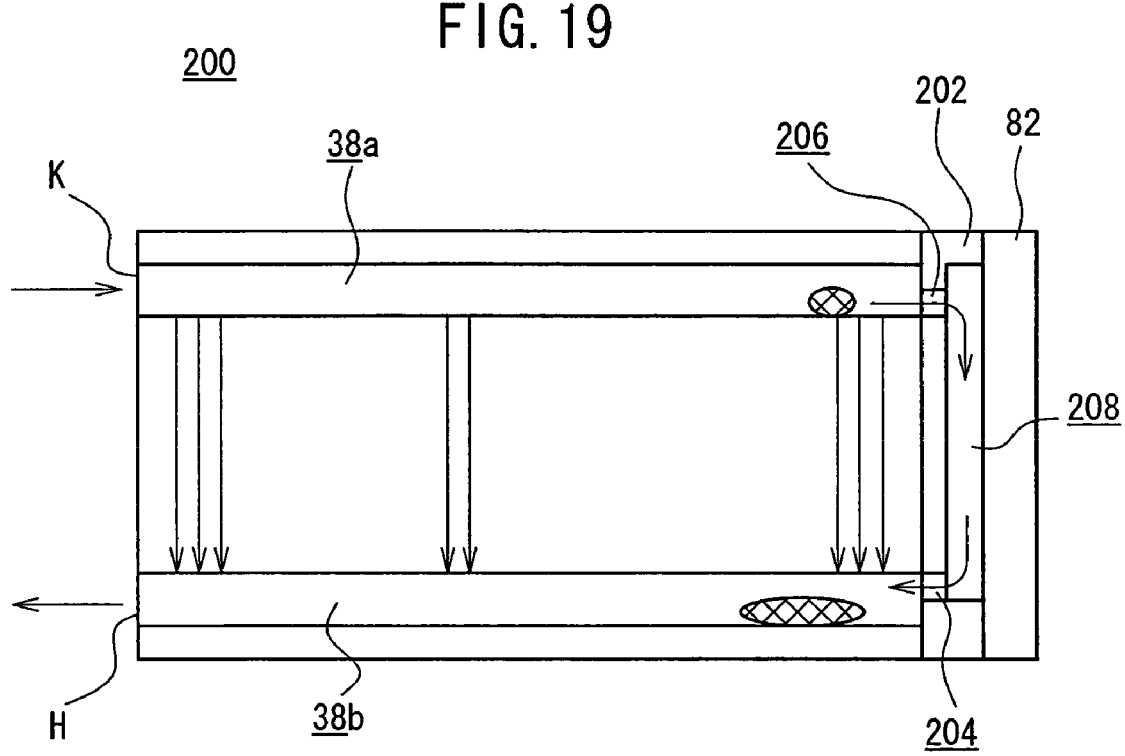
FIG. 19 shows a schematic view diagrammatically illustrating a fuel cell stack according to a seventh embodiment of the present invention.

The fuel cell stack 200 comprises a bypass plate 202 which is tightened and fastened by the tie rods 84 together with the second end plate 82. As shown in FIGS. 16, 17, and 18, the bypass plate 202 is arranged in tight contact with the surface 14b of the first separator 14 which is disposed on the deep side of the inlet side oxygen-containing gas communication hole 38a and the outlet side oxygen-containing gas communication hole 38b of the fuel cell stack 200, i.e., on the deep side as viewed from a supply port K of the inlet side oxygen-containing gas communication hole 38a and a discharge port H of the outlet side oxygen-containing gas communication hole 38b as shown in FIG. 19 as described later on. An inlet side oxygen-containing gas communication hole 38a of the bypass plate 202 is provided at the position corresponding to the inlet side oxygen-containing gas communication hole 38a of the first separator 14.

Discharge holes 204 for supplying the oxygen-containing gas to be used for the reaction, which are provided for the bypass plate 202, are disposed at positions corresponding to a bottom T2 of the outlet side oxygen-containing gas communication hole 38b of the first separator 14 in a direction directed along the outlet side oxygen-containing gas communication hole 38b of the first separator 14.

As shown in FIGS. 16 and 17, bypass flow passages 208, which make communication between the outlet holes 204 and a plurality of inlet holes 206 having rectangular cross sections formed at the hole wall of the inlet side oxygen-containing gas communication hole 38a of the bypass plate 202, are provided on the surface 202b of the bypass plate 202 on the side opposite to the surface 202a to make tight contact with the first separator 14.

The bypass flow passages 208 includes three groove-shaped supply passages 208a which makes connection over a range from the inlet side oxygen-containing gas communication hole 38a to the discharge holes 204 at diagonal positions, and two auxiliary supply passages 208b which extend from the inlet holes 206 along the upper and lower supply passages 208a of the supply passages 208a and which are merged into the supply passages 208a at intermediate positions.

As shown in FIG. 17, as for the inlet side oxygen-containing gas communication hole 38a of the bypass plate 202, the bottom T1, which provides an opening position of the lowermost inlet hole 206, is set at a position (also shown in FIG. 18) that is lower by a height Δh1 than the inlet side oxygen-containing gas communication hole 38a of the first separator 14. The discharge hole 204 is located at the bottom T2 of the outlet side oxygen-containing gas communication hole 38b of the first separator 14. The discharge hole 204 is opened at a position which is lower by a height Δh2 than the position of the lowermost second oxygen-containing gas connecting flow passage 48.

In order to avoid the back flow, the upper two of the supply passages 208a are bent at positions just before the discharge holes 204, and they are formed and directed downwardly. The auxiliary supply passages 208b are also bent at positions just before the merging points P of the supply passages 208a, and they are formed and directed downwardly.

The bypass plate 202 constructed as described above is tightened and fastened by the tie rods 84 together with the end plate 82 as shown in FIG. 15 in a state in which a terminal plate 210 and an insulating plate 212 are allowed to intervene as shown in FIG. 18. Therefore, strictly speaking, the bypass flow passages 208 are formed between the bypass plate 202 and the terminal plate 210.

The bypass flow passages 208 are designed so that the oxygen-containing gas flows in a flow rate which is not less than a flow rate of the flow of the oxygen-containing gas through the fuel cell unit 12.

As schematically shown in FIG. 19, in the fuel cell stack 200, the deep portion of the inlet side oxygen-containing gas communication hole 38a and the deep portion of the outlet side oxygen-containing gas communication hole 38b are connected to one another by the bypass flow passages 208 formed, for example, by the bypass plate 202 and the end plate 82. Accordingly, a return flow structure is formed, in which the supply port K of the inlet side oxygen-containing gas communication hole 38a as the side to supply the oxygen-containing gas and the discharge port H of the outlet side oxygen-containing gas communication hole 38b as the side to discharge the gas after the reaction are provided on the same side, i.e., on the first side surface side of the fuel cell stack 200. In this arrangement, the single bypass plate 202, which has the thin plate-shaped configuration, is used. Therefore, the structure is advantageous in that no piping is required at the outside of the fuel cell stack 200. It is possible to shorten the size of the fuel cell unit 12 in the stacking direction.

The supply port K and the discharge port H are disposed on the same side. Therefore, a merit is obtained such that the piping for the supply port K and the discharge port H can be provided as collected piping which is advantageous in the number of assembling steps and the number of parts.

In the seventh embodiment constructed as described above, the product water tends to stay on the deep side of the outlet side oxygen-containing gas communication hole 38b as compared with the front side. However, a part of the oxygen-containing gas, which is supplied to the inlet side oxygen-containing gas communication hole 38a, passes from the inlet hole 206 of the bypass plate 202 through the bypass flow passages 208 as shown in FIG. 19, and it is ejected at the discharge hole 204 to the outlet side oxygen-containing gas communication hole 38b. Accordingly, the product water, which is retained at the deep portion of the outlet side oxygen-containing gas communication hole 38b, is extruded toward the discharge port H. This arrangement is also preferred especially in the case of application to the vehicle which runs in an inclined state.

In this arrangement, as shown in FIG. 17, the auxiliary supply passages 208b are merged into the supply passages 208a of the bypass flow passages 208. Therefore, the flow rate is increased at the discharge hole 204. It is possible to efficiently extrude the product water at the discharge hole 204. In this arrangement, the position of the discharge hole 204 (position of the bottom T2 of the outlet side oxygen-containing gas communication hole 38b) is set to be lower by Δh2 than that of the second oxygen-containing gas connecting flow passage 48. Therefore, there is no fear of back flow.

On the other hand, the water is generated in some cases due to the condensation of water vapor at the inlet side oxygen-containing gas communication hole 38a, because the oxygen-containing gas is humidified. However, the position of the inlet hole 206 of the bypass flow passage 204 (position of the bottom T1 of the inlet side oxygen-containing gas communication hole 38a of the bypass plate 202) is set to be lower by Δh1 than that of the bottom of the inlet side oxygen-containing gas communication hole 38a, for example, of the first separator 14 and the first gasket 28. Therefore, it is also possible to efficiently discharge the condensed water.

Therefore, in the seventh embodiment, the drainage performance is remarkably improved for the retained product water and the condensed water, and it is possible to avoid the deterioration of the power generation performance, by forcibly extruding the oxygen-containing gas from the discharge hole 204 by the aid of the bypass flow passage 202, in addition to the improvement in drainage performance owing to the capillary phenomenon of the porous water-absorbing tube 86 and the difference in pressure of air in the outlet side oxygen-containing gas communication hole 38b.

The bypass flow passage 202 used in the seventh embodiment described above may be incorporated into any one of the second to fifth embodiments.

Figure 20:
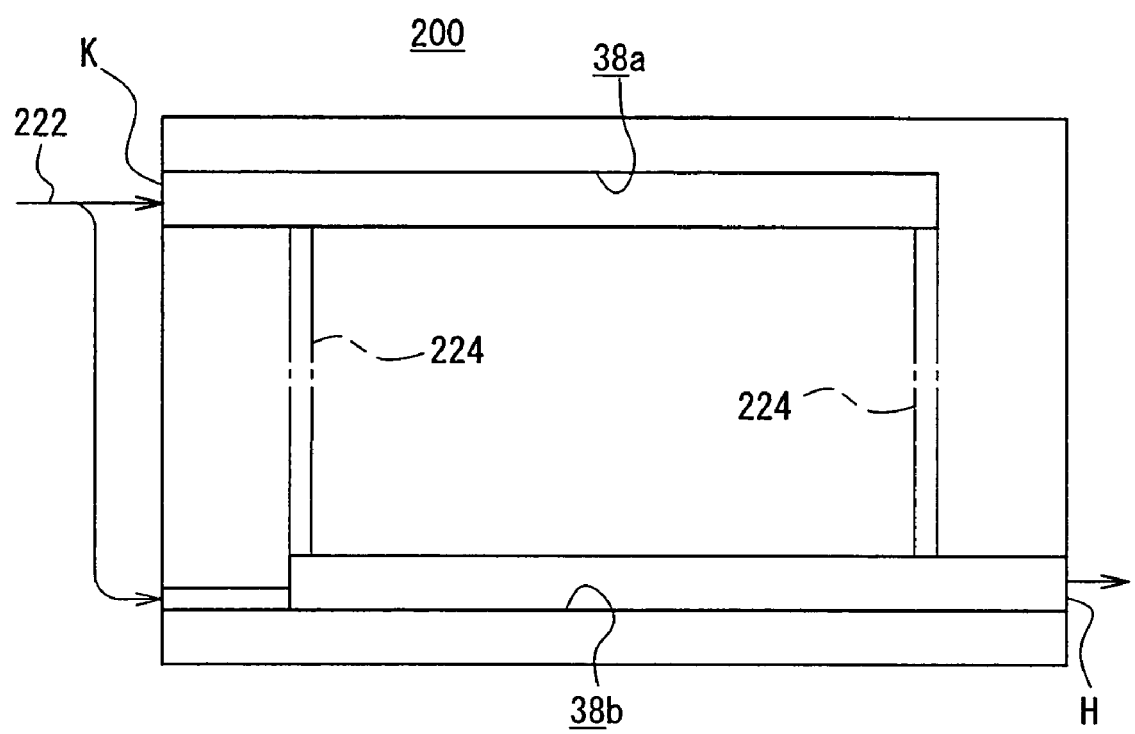
FIG. 20 shows a schematic view illustrating a layout of a bypass flow passage according to an eighth embodiment of the present invention.

FIG. 20 diagrammatically shows a fuel cell stack 220 according to an eighth embodiment of the present invention. Specifically, FIG. 20 shows another embodiment of the bypass flow passage 202.

The eighth embodiment is different from the seventh embodiment as shown in FIG. 19. The supply port K of the inlet side oxygen-containing gas communication hole 38a and the discharge port H of the outlet side oxygen-containing gas communication hole 38b are provided on different sides, i.e., on the sides of the opposing surfaces of the fuel cell stack 220.

In the eighth embodiment, the supply port K is arranged on the same side as the deep side of the outlet side oxygen-containing gas communication hole 38b. Therefore, the oxygen-containing gas for the inlet side oxygen-containing gas communication hole 38a is branched with a branched tube 222, and it is supplied to the outlet side oxygen-containing gas communication hole 38b.

Accordingly, also in this case, the product water, which is retained at the deep portion of the outlet side oxygen-containing gas communication hole 38b, can be extruded from the discharge port H. During this process, when the condensed water is retained at the deep portion and the front portion of the inlet side oxygen-containing gas communication hole 38a, the condensed water on the side of the inlet side oxygen-containing gas communication hole 38a can be also smoothly discharged by providing a bypass passage 224 as shown by dashed lines in FIG. 20.

Figure 21:
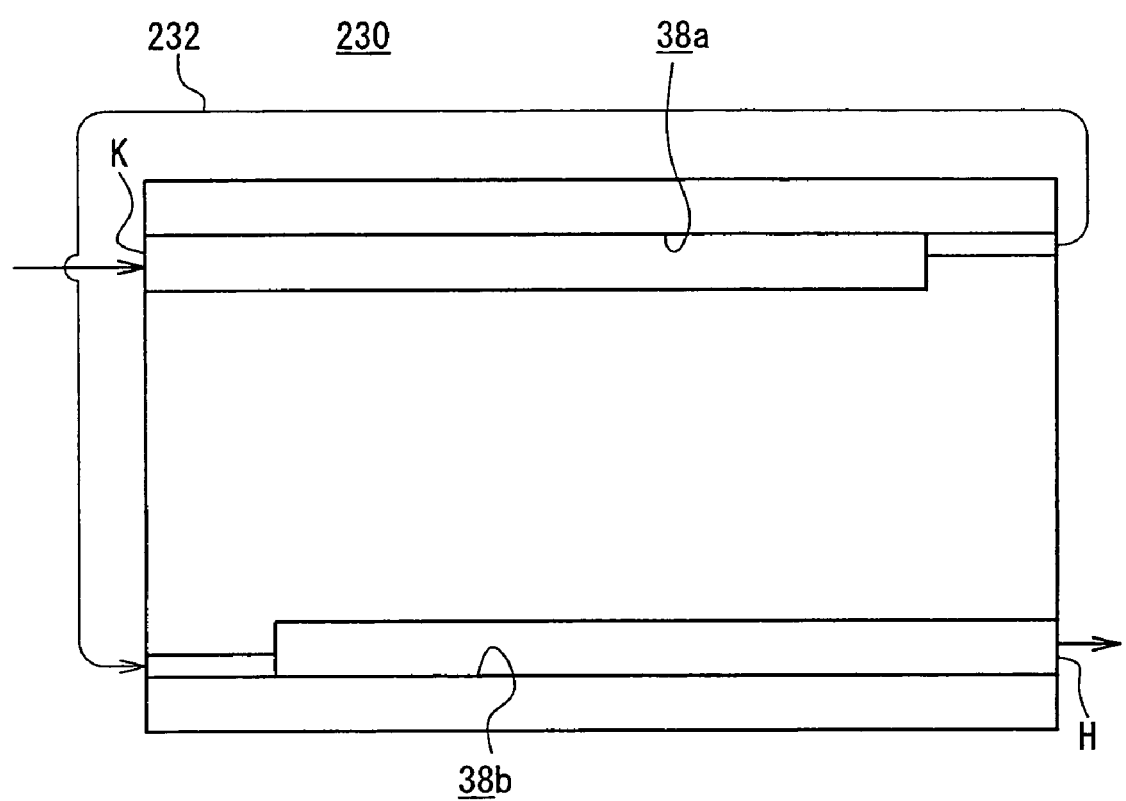
FIG. 21 shows a schematic view illustrating a layout of a bypass flow passage according to a ninth embodiment of the present invention.

FIG. 21 diagrammatically shows a fuel cell stack 230 according to a ninth embodiment of the present invention. Even in the case of the arrangement of the inlet side oxygen-containing gas communication hole 38a and the outlet side oxygen-containing gas communication hole 38b in the same manner as in FIG. 20, a piping 232 can be detoured to connect the deep portion of the inlet side oxygen-containing gas communication hole 38a and the front portion of the outlet side oxygen-containing gas communication hole 38b. Also in this case, in the same manner as in the eighth embodiment described above, it is possible to reliably discharge the product water at the deep portion of the outlet side oxygen-containing gas communication hole 38b and the condensed water at the inlet side oxygen-containing gas communication hole 38a.

The present invention is not limited to the respective embodiments described above. For example, in place of the provision of the bypass plate 202 of the seventh embodiment, a bypass piping for connecting the inlet side oxygen-containing gas communication hole 38a and the outlet side oxygen-containing gas communication hole 38b may be provided at the outside of the second end plate 82. The respective embodiments are illustrative of the case in which the discharge hole 204 and the porous water-absorbing tube are simultaneously used. However, the porous water-absorbing tube may be abolished, and only the discharge hole 204 may be provided, provided that the product water or the like is sufficiently discharged. Alternatively, a plurality of discharge holes 204 may be provided in the length direction of the outlet side oxygen-containing gas communication hole 38b to extrude the product water from an intermediate portion as well as the deep portion as viewed from the side of the discharge port H of the outlet side oxygen-containing gas communication hole 38b.

Figure 22:
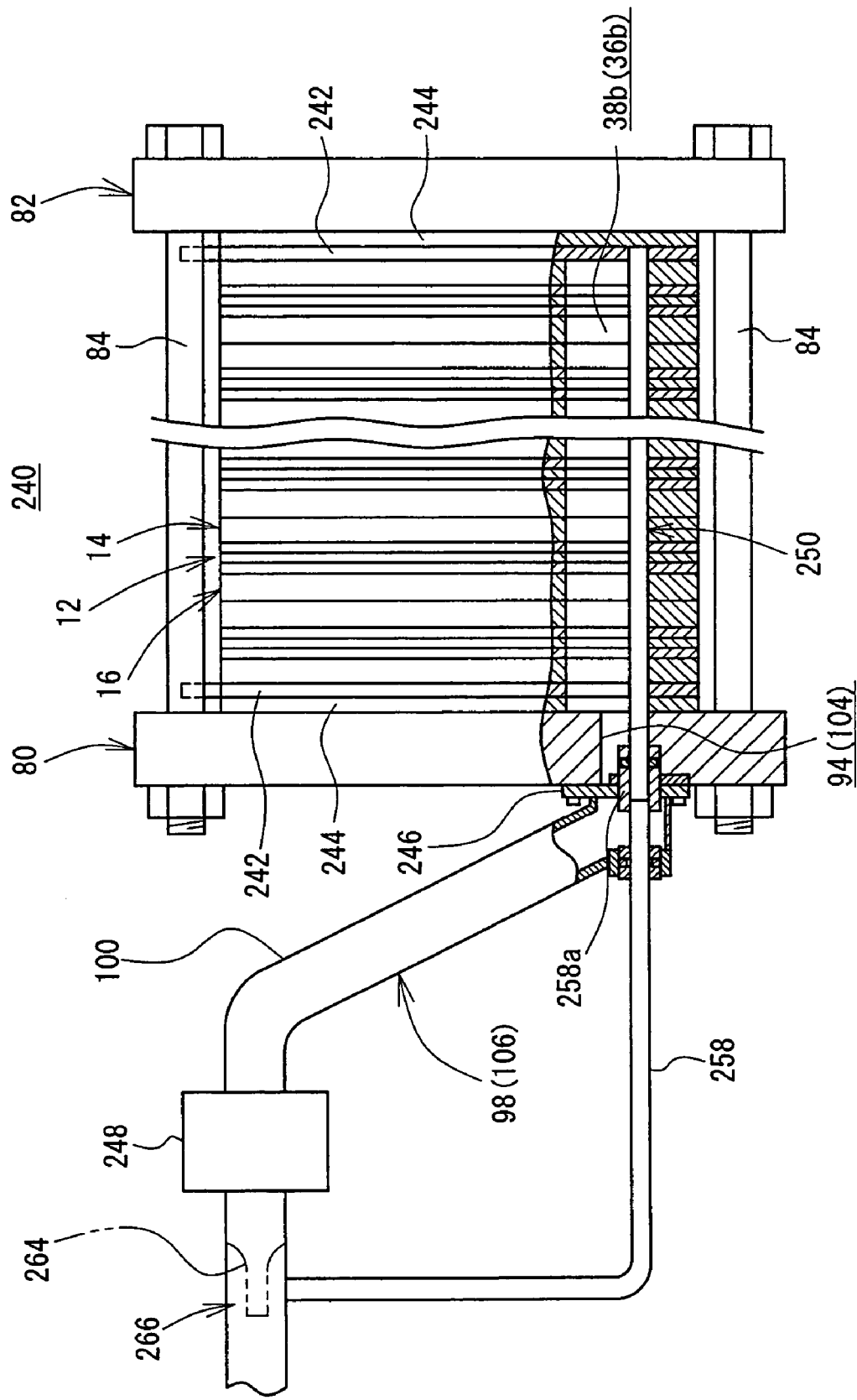
FIG. 22 shows a schematic vertical sectional view illustrating a fuel cell stack according to a tenth embodiment of the present invention.

FIG. 22 shows a schematic sectional view illustrating a fuel cell stack 240 according to a tenth embodiment of the present invention.

Reference numeral 242 indicates a terminal plate, and reference numeral 244 indicates an insulator plate. The terminal plate 242 and the insulator plate 244 are overlapped with the second separator 16 in an order of the terminal plate 242 and the insulator plate 244 on the side of the first end plate 80, and they are tightened and fastened together with the first end plate 80 by means of the tie rods 84. On the other hand, the terminal plate 242 and the insulator plate 244 are overlapped with the first separator 14 in an order of the terminal plate 242 and the insulator plate 244 on the side of the second end plate 82, and they are tightened and fastened together with the second end plate 82 by means of the tie rods 84.

Each of the terminal plate 242 and the insulator plate 244 on the side of the first end plate 80 is also provided, at both end portions in the lateral direction, with an inlet side fuel gas communication hole 36a, an inlet side oxygen-containing gas communication hole 38a, an inlet side cooling medium communication hole 40a, an outlet side cooling medium communication hole 40b, an outlet side fuel gas communication hole 36b, and an outlet side oxygen-containing gas communication hole 38b. The first end plate 80 is formed with a hole 94 which communicates with the outlet side oxygen-containing gas communication hole 38b. A manifold tube 98, which communicates with the hole 94, is connected to the first end plate 80 by the aid of a joint 246.

The manifold tube 98 includes an outer tube (gas flow passage) 100 which extends from the joint 246. The outer tube 100 rises upwardly, and it is open to the atmospheric air. A back pressure valve 248 for adjusting the pressure in the fuel cell stack 240 is provided at an intermediate position of the outer tube 100. A drainage pipe (suction member) 250 is inserted into the outlet side oxygen-containing gas communication hole 38b and the hole 94 of the first end plate 80 in a state of making no contact with the surroundings.

Figure 23:
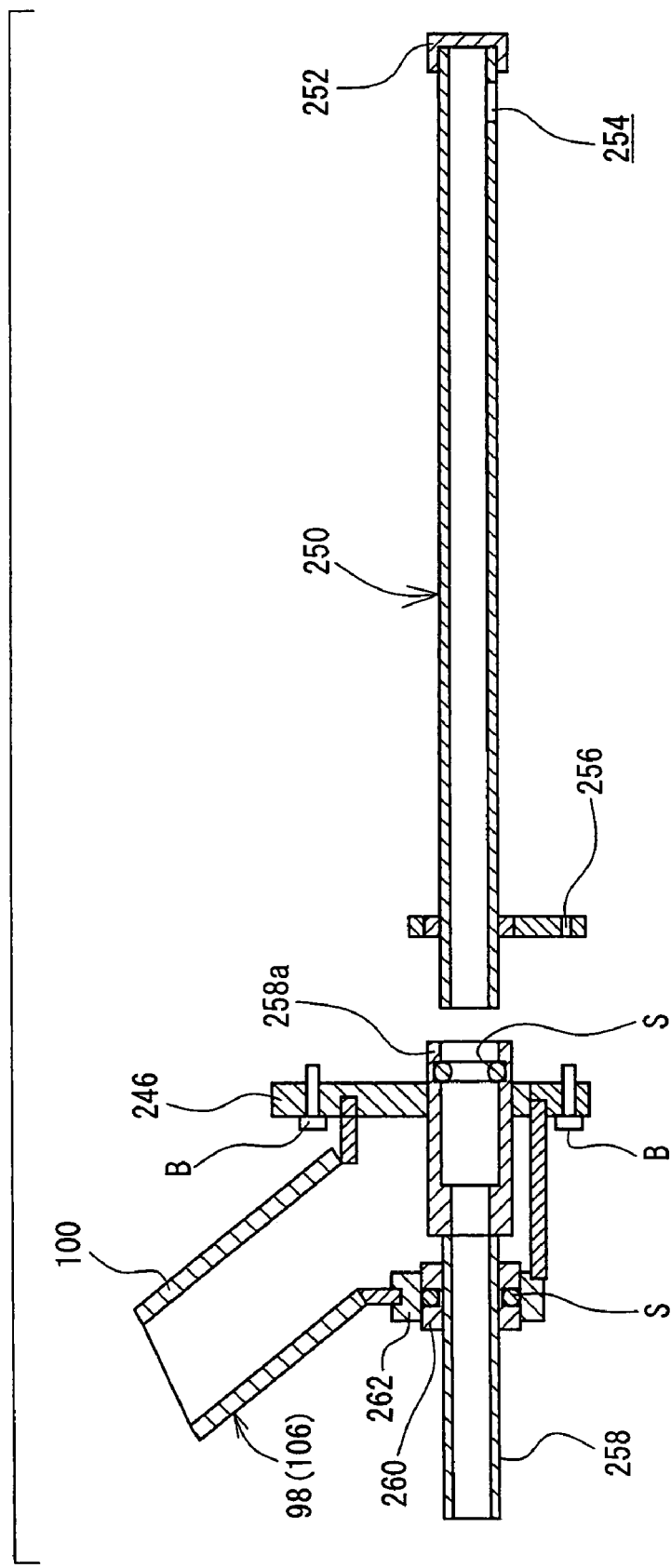
FIG. 23 shows a sectional view illustrating an attached state of a manifold tube and a drainage pipe.
Figure 24:
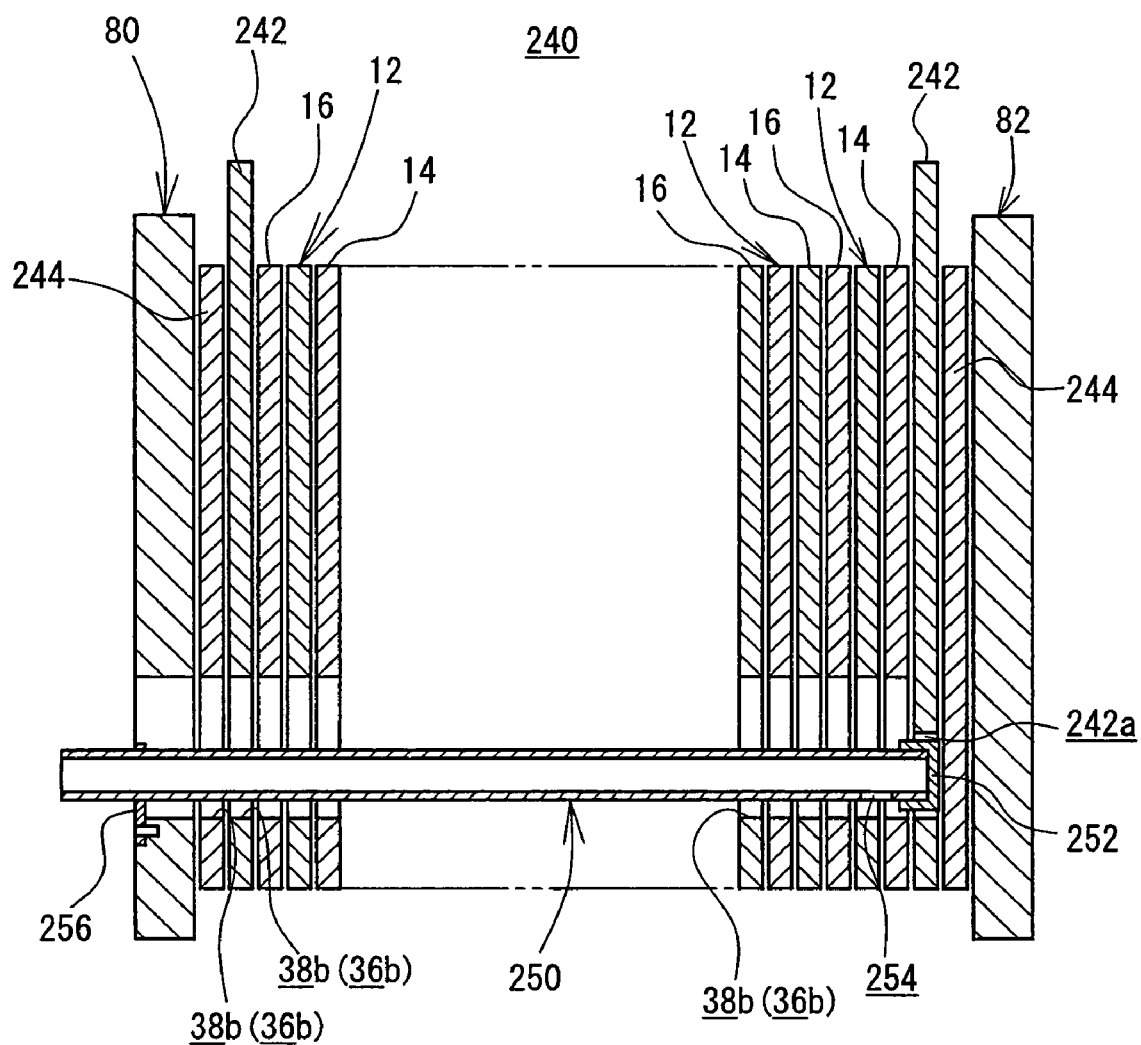
FIG. 24 shows a sectional view illustrating an inserted situation of the drainage pipe.
Figure 25:
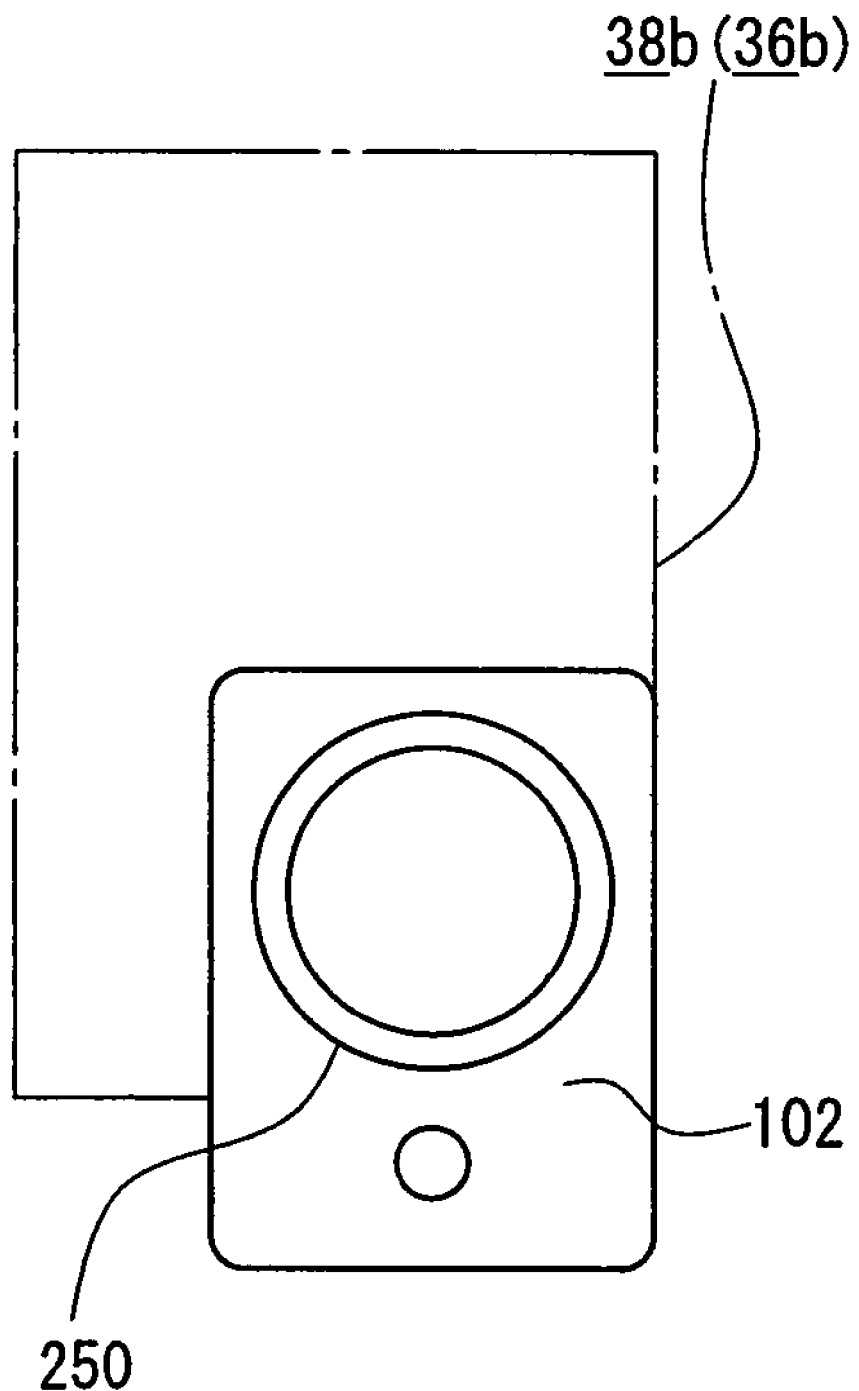
FIG. 25 shows a front view illustrating the drainage pipe shown in FIG. 24.

As shown in FIGS. 23 to 25, the drainage pipe 250 is applied to a resin coating for the outer wall in order to ensure the insulation performance with respect to the inner wall of the outlet side oxygen-containing gas communication hole 38b. A resin end cap 252 is attached to the end of the insertion side in order to ensure the insulation performance as well. The drainage pipe 250 is supported in a state of being inserted into a fitting hole 242a which is formed for the terminal plate 242 disposed on the side of the second end plate 82.

A suction hole (opening) 254, which is open in the outlet side oxygen-containing gas communication hole 38b, is provided at the lower wall at the end on the insertion side of the drainage pipe 250, i.e., on the lower side in the direction of the gravity. A stay plate 256 is attached to the outer circumference at the end on the first end plate 80 of the drainage pipe 250. The stay plate 256 is positioned with respect to the first end plate 80, and it is tightened together with the joint 246. Therefore, a merit is obtained such that the stay plate 256 can be used to correctly set the drainage pipe 250 in the outlet side oxygen-containing gas communication hole 38b. The end of the drainage pipe 250 on the side of the first end plate 80 slightly protrudes from the first end plate 80.

A bypass tube (outlet side flow passage) 258 is connected to the drainage pipe 250 formed as described above. As shown in FIG. 22, the bypass tube 258 has one end which is connected to the drainage pipe 250, and the other end which is connected to the downstream side of the back pressure valve 248. As shown in FIG. 23, a female connector 258a is attached to the one end of the bypass tube 258. The drainage pipe 250 is fitted and connected to the female connector 258a. The female connector 258a is inserted and fixed into the joint 246 in a state of penetrating through the joint 246. A seal ring S for sealing the drainage pipe 250 is provided on the inner circumferential surface of the female connector 258a.

A ring member 260, which is provided with a seal ring S on the outer circumferential surface, is attached in the vicinity of the attachment portion of the bypass tube 258 to the female connector 258a. The ring member 260 is inserted in a sealed state into the inner circumferential surface of a pipe support holder 262 which is provided around the insertion section of the outer tube 100. The joint 246 of the manifold tube 98 constructed as described above is tightened and fastened to the first end plate 80 together with the stay plate 256 by the aid of bolts B.

A hole 104, which communicates with the outlet side fuel gas communication hole 36b, is formed for the first end plate 80. A manifold tube 106, which is constructed in the same manner as the manifold tube 98 described above, is connected to the hole 104. The drainage pipe 250 is inserted into the hole 104. The bypass tube 258 is connected in communication with the drainage pipe 250. These structures and the like are the same as those of the outlet side oxygen-containing gas communication hole 38b. The same components are designated by the same reference numerals, detailed explanation of which will be omitted.

As shown by chain lines in FIG. 22, a throttle section 264 is provided at the inside of the outer tube 100 at the connecting portion of the bypass tube 258 connected to the downstream side of the back pressure valve 248. Accordingly, an ejector section 266 can be formed by the bypass tube 258 and the throttle section 264 as well.

The operation of the fuel cell stack 240 according to the tenth embodiment constructed as described above will be explained below.

During the operation of the fuel cell stack 240, the pressure in the system is adjusted to be constant by the aid of the back pressure valve 248. Therefore, a certain differential pressure is generated between the upstream side and the downstream side of the back pressure valve 248. The difference in pressure is generated by the differential pressure between the side of the first end plate 80 and the side of the back pressure valve 248 of the bypass tube 258. As a result, the product water in the outlet side oxygen-containing gas communication hole 38b is sucked from the suction hole 254 of the drainage pipe 250. The product water passes through the bypass tube 258, and it is discharged together with the reacted gas from the manifold tube 98 to the outside of the system.

Similarly, for example, the product water, which is generated by condensation of the water vapor of the fuel gas stored in the outlet side fuel gas communication hole 36b, is also sucked from the suction hole 254 of the drainage pipe 250. The product water passes through the bypass tube 258, and it is discharged together with the reacted gas from the manifold tube 98 to the outside of the system.

Accordingly, when the product water or the like is retained in the outlet side oxygen-containing gas communication hole 38b and the outlet side fuel gas communication hole 36b, then the product water can be sucked from the suction hole 254 of the drainage pipe 250, and it can be discharged to the outside. Therefore, it is possible to improve the drainage performance for the product water or the like retained in the outlet side oxygen-containing gas communication hole 38b and the outlet side fuel gas communication hole 36b, and it is possible to avoid the deterioration of the power generation performance, which would be otherwise caused by the back flow of water droplets into the power-generating surface. That is, the water is discharged by the suction based on the differential pressure not by the gravity. Therefore, it is possible to perform the drainage quickly and reliably.

As a result, even when the water is retained on the deep side of the outlet side oxygen-containing gas communication hole 38b and the outlet side fuel gas communication hole 36b disposed on the side opposite to the first end plate 80, the water can be reliably discharged. Therefore, this arrangement is preferred when the fuel cell stack 240 is used for the vehicle in which the fuel cell stack 240 is used in an inclined state.

Further, the product water, which tends to be retained on the lower side by the gravity, can be sucked and removed by using the drainage pipe 250 from the outlet side oxygen-containing gas communication hole 38b and the outlet side fuel gas communication hole 36b disposed on the lower side in the direction of the gravity. Therefore, it is possible to efficiently discharge the water from the lower portions in the direction of the gravity in which the back flow to the power-generating surface is apt to occur, and a large amount of product water or the like is retained. In this arrangement, it is possible to reliably discharge the water from the outlet side oxygen-containing gas communication hole 38b and the outlet side fuel gas communication hole 36b by the aid of the suction hole 254 formed on the lower side in the direction of the gravity.

Further, the back pressure valve 248, which is provided for the outlet side oxygen-containing gas communication hole 38*b* and the outlet side fuel gas communication hole 36*b*, is effectively utilized to make it possible to suck and remove the product water retained in the outlet side oxygen-containing gas communication hole 38*b* and the outlet side fuel gas communication hole 36*b* from the suction hole 254 of the drainage pipe 250. Therefore, it is unnecessary to provide any additional pump or the like, and is possible to simplify the structure. As described above, when the ejector section 264 is provided, it is possible to perform the drainage more effectively, because the force for drawing the water by the drainage pipe 250 is increased by the ejector action.

In the fuel cell stack 240 described above, the piping is attached to only one side of the end plate. Therefore, the following effect is obtained. That is, it is possible to decrease the piping space, it is possible to use the collective piping, and thus the piping structure is simplified.

In the tenth embodiment described above, for example, the drainage pipe 250 described above may be also provided for the inlet side fuel gas communication hole 36*a* and the inlet side oxygen-containing gas communication hole 38*a*. In this arrangement, it is possible to avoid any invasion of water droplets into the power-generating surface from the inlet side fuel gas communication hole 36*a* and the inlet side oxygen-containing gas communication hole 38*a*.

The tenth embodiment is illustrative of the case in which the drainage pipe 250 is provided for the outlet side oxygen-containing gas communication hole 38*b* and the outlet side fuel gas communication hole 36*b*. However, for example, it is also preferable that the drainage pipe 250 is provided for only the side of the outlet side oxygen-containing gas communication hole 38*b* in which a large amount of product water is retained. The position of the suction hole 254 formed for the drainage pipe 250 is not limited to the end portion on the side of the second end plate 82. The suction hole 254 may be provided at the end portion on the side of the first end plate 80. In this arrangement, even when the fuel cell stack 240 is inclined toward either the first end plate 80 or the second end plate 82, it is possible to discharge the water from either suction hole 254 in a reliable manner. Of course, a plurality of suction holes may be provided over an entire region of the insertion section of the drainage pipe 250.

The formation portion is not limited to the outer circumferential edge portion provided that the inlet side fuel gas communication hole 36*a*, the inlet side oxygen-containing gas communication hole 38*a*, the outlet side fuel gas communication hole 36*b*, and the outlet side oxygen-containing gas communication hole 38*b* are formed in the planes of the first and second separators 14, 16.

Figure 26:
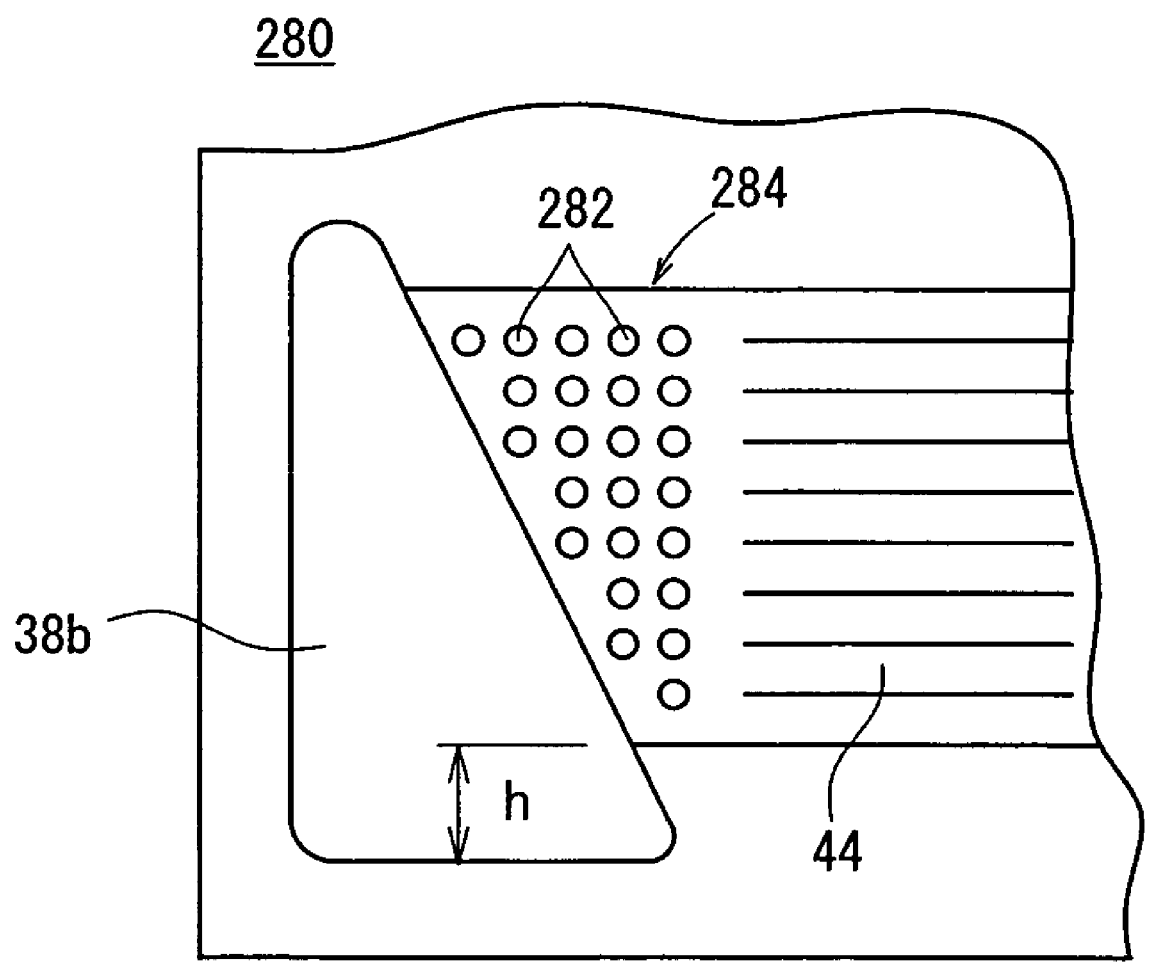
FIG. 26 shows a part of a separator of a fuel cell according to an eleventh embodiment of the present invention.

FIG. 26 shows a part of a first separator 28 of a fuel cell according to an eleventh embodiment of the present invention.

The first separator 280 has a buffer section 284 between the end of the second oxygen-containing gas flow passage grooves 44 and the outlet side oxygen-containing gas communication hole 38*b*. A plurality of bosses 282 are formed in the buffer section 284. The bottom of the second oxygen-containing gas flow passage grooves 44 is spaced from the bottom of the outlet side oxygen-containing gas communication hole 38*b* by the height h. Thus, the water is smoothly discharged into the outlet side oxygen-containing gas communication hole 38*b*, and is not trapped between the bosses 282 and the bottom of the second oxygen-containing gas flow passage groves 44. The buffer section 284 is not essential depending on the application. If the buffer section 284 is not provided, the second oxygen-containing gas flow passage grooves 44 are directly connected to the outlet side oxygen-containing gas communication hole 38*b*.

Figure 27:
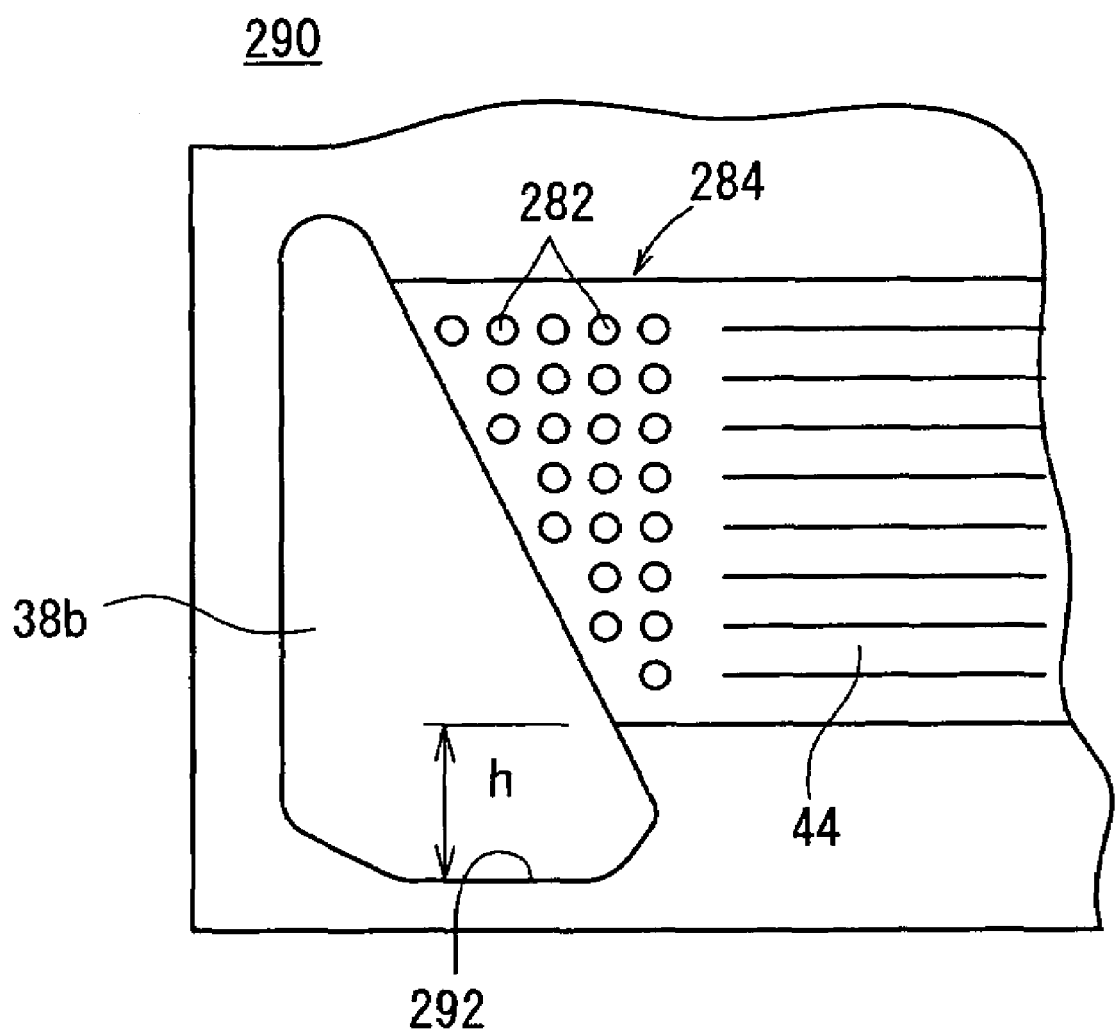
FIG. 27 shows a part of a separator of a fuel cell according to an twelfth embodiment of the present invention.
Figure 28:
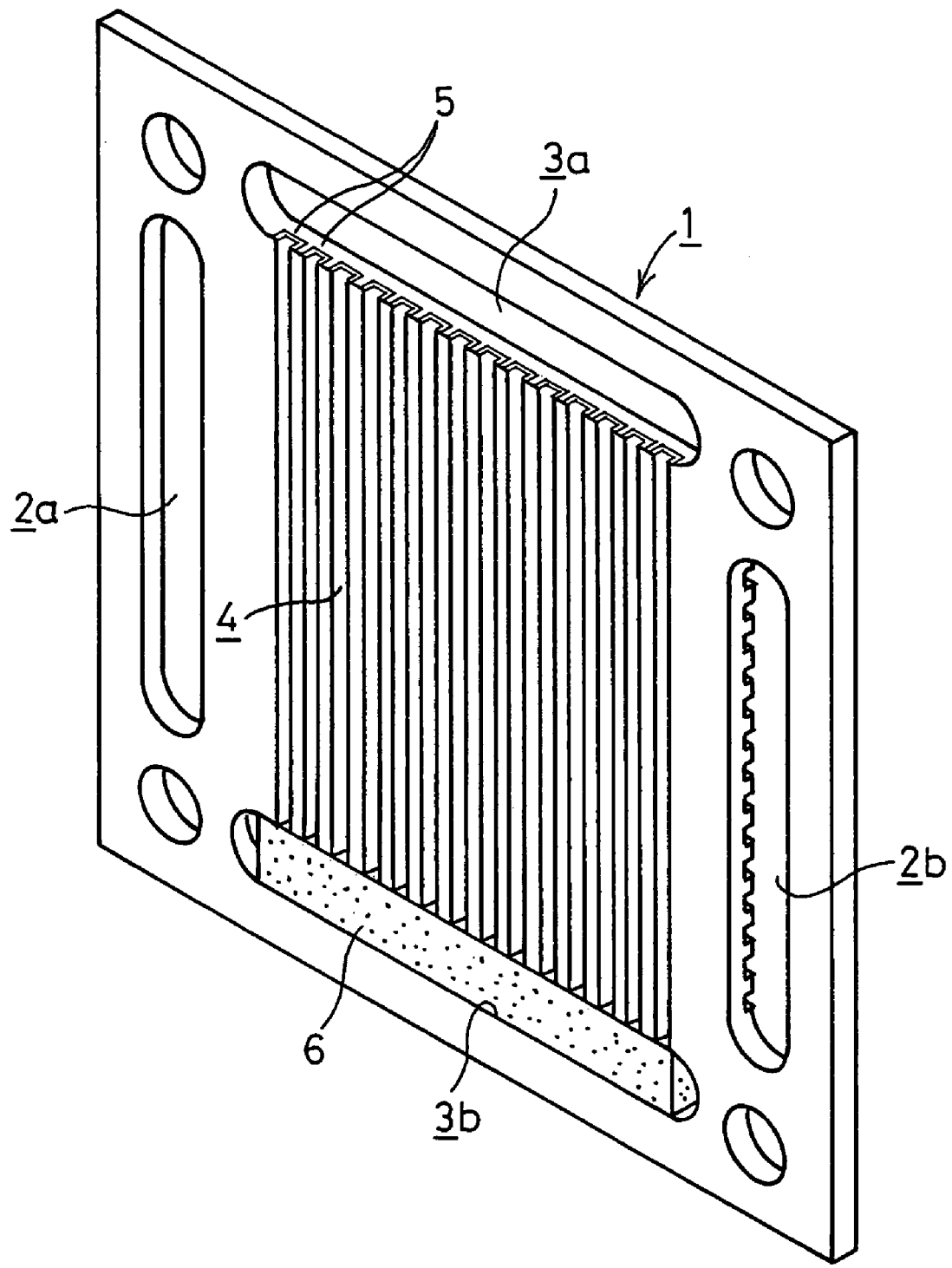
FIG. 28 shows a perspective view illustrating a collector electrode concerning the conventional technique.

FIG. 27 shows a part of a first separator 290 of a fuel cell according to a twelfth embodiment of the present invention.

The first separator 290 has the similar structure as the first separator 280 according to the eleventh embodiment, but differs in that the bottom of the outlet side oxygen-containing gas communication hole 38*b* is cut out to form a dent section 292 having a narrow bottom. The bottom of the second oxygen-containing gas flow passage grooves 44 is spaced from the narrow bottom of the dent section 292 in the outlet side oxygen-containing gas communication hole 38*b* by the height h. Thus, the water is even more smoothly discharged from the second oxygen-containing gas flow passage grooves 44 into the outlet side oxygen-containing gas communication hole 38*b*.

In the fuel cell stack according to the present invention, the communication holes for allowing the reaction gas to flow are provided at the outer circumferential edge portions on the side of the separator. Accordingly, it is possible to shorten the size in the height direction as small as possible, and it is easy to realize the thin type. Further, the water in the communication hole can be discharged smoothly and reliably owing to the capillary phenomenon and the difference in pressure of the reaction gas by the aid of the porous water-absorbing tube arranged in the communication hole. Accordingly, even when the fuel cell stack is arranged in an inclined manner due to any inclination of the vehicle or the like, then the back flow of the water to the gas flow passage can be effectively excluded, the power generation performance can be ensured, and it is possible to greatly improve the drainage performance with the simple structure.

According to the present invention, even if the product water or the like is retained in the outlet side communication hole, when the reaction gas is supplied from the discharge hole, then the product water or the like, which is retained in the outlet side communication hole, is extruded by the reaction gas ejected from the discharge hole. Therefore, it is possible to improve the drainage performance for the product water or the like retained in the outlet side communication hole, especially the drainage performance for the product water or the like which is retained at the deep portion and which is difficult to be discharged. Accordingly, it is possible to enhance the drainage performance for the product water or the like even when the size of the entire fuel cell stack in the stacking direction is long.

Further, according to the present invention, when the product water or the like is retained in the inlet side communication hole or the outlet side communication hole, then the product water can be sucked from the opening of the suction member, and it can be discharged to the outside. Therefore, it is possible to improve the drainage performance for the product water or the like retained in the inlet side communication hole or the outlet side communication hole. As for the inlet side communication hole, it is possible to avoid any invasion of water droplets into the power-generating surface. As for the outlet side communication hole, it is possible to avoid any back flow of water droplets into the power-generating surface. Thus, it is possible to avoid the deterioration of the power generation performance.

What is claimed is:

1. A fuel cell formed by stacking a fuel cell unit and separators in a horizontal direction such that said separators are placed in an upright position and said fuel cell unit is sandwiched between said separators, said fuel cell unit including an anode, a cathode, and a solid polymer electrolyte membrane interposed between said anode and said cathode, communication holes extending in the horizontal direction through said separators, said communication holes including a first communication hole extending through said separators at an upper position, and a second communication hole extending through said separators at a lower position; and a reaction gas flow passage formed on at least one of said separators, said reaction gas flow passage having an inlet connected to said first communication hole, and an outlet connected to said second communication hole such that said reaction gas flows along an electrode surface, wherein the inlet of the reaction gas flow passage is positioned higher than the outlet of the reaction gas flow passage in the direction of gravity, wherein a bottom of said outlet of said reaction gas flow passage is positioned, in use, higher than a bottom of said second communication hole, wherein said second communication hole is disposed along a vertical side of said reaction gas flow passage, and wherein said second communication hole and said reaction gas flow passage are formed in a single body, and wherein a lowest portion of said reactant gas flow passage is positioned, in use, higher than said bottom of said second communication hole, wherein said reaction gas flow passage comprises a plurality of grooves, and said grooves of said reaction gas flow passage are connected to one ends of connection holes on one surface of said separator, and the other ends of said connection holes are connected to said second communication hole on the other surface of said separator.

2. The fuel cell according to claim 1, wherein said reaction gas flow passage comprises a plurality of grooves, and a buffer section is provided between said grooves of said reaction gas flow passage and said second communication hole.

3. The fuel cell according to claim 1, wherein said reaction gas flow passage comprises a plurality of grooves, and said grooves of said reaction gas flow passage are directly connected to said second communication hole.

4. The fuel cell according to claim 1, wherein said reaction gas flow passage comprises a continuous groove connecting said first communication hole and said second communication hole.

5. The fuel cell according to claim 4, wherein said flow groove is a serpentine groove.

6. The fuel cell according to claim 4, wherein said groove is a straight groove that does not turn back along a path from said first communication hole to said second communication hole.

7. The fuel cell according to claim 1, wherein said fuel cell is configured to be mounted in a vehicle.

8. The fuel cell according to claim 1, wherein a dent section is formed on the bottom of said second communication hole.

* * * * *